March 24, 1970  R. L. BRASS  3,503,043
APPARATUS FOR INTERROGATING ALPHA-NUMERIC CHARACTERS
Filed Nov. 17, 1960  10 Sheets-Sheet 1

INVENTOR
R.L. BRASS
BY
G.E.Hirsch Jr.
ATTORNEY

March 24, 1970     R. L. BRASS     3,503,043
APPARATUS FOR INTERROGATING ALPHA-NUMERIC CHARACTERS
Filed Nov. 17, 1960     10 Sheets-Sheet 2

| MODE | REGISTER OUTPUT | | | CORE MEMORY OUTPUT | | | MODE TRANSLATOR OUTPUT | ADVANCE | TRANSFER |
|---|---|---|---|---|---|---|---|---|---|
| | R1 | R2 | R3 | CM1 | CM2 | CM3 | | | |
| 1 | 0 | 0 | 1 | 0 | 0 | 1 | MT1 | OP1 | |
| 2 | 0 | 1 | 0 | 1 | 0 | 1 | MT5 | OP2 | OP4 |
| 3 | 0 | 1 | 1 | 0 | 1 | 0 | MT2, MT4 | OP2 | OP4 |
| 4 | 1 | 0 | 0 | 0 | 1 | 0 | MT2, MT3, MT4 | | OP3 OR OP4 |
| 5 | 1 | 0 | 1 | 0 | 0 | 1 | MT3, MT4 | OP1 | OP3 |
| 6 | 1 | 1 | 0 | 0 | 1 | 0 | | | TRANSFER WHEN IN THIS MODE |

INVENTOR
R. L. BRASS
BY
ATTORNEY

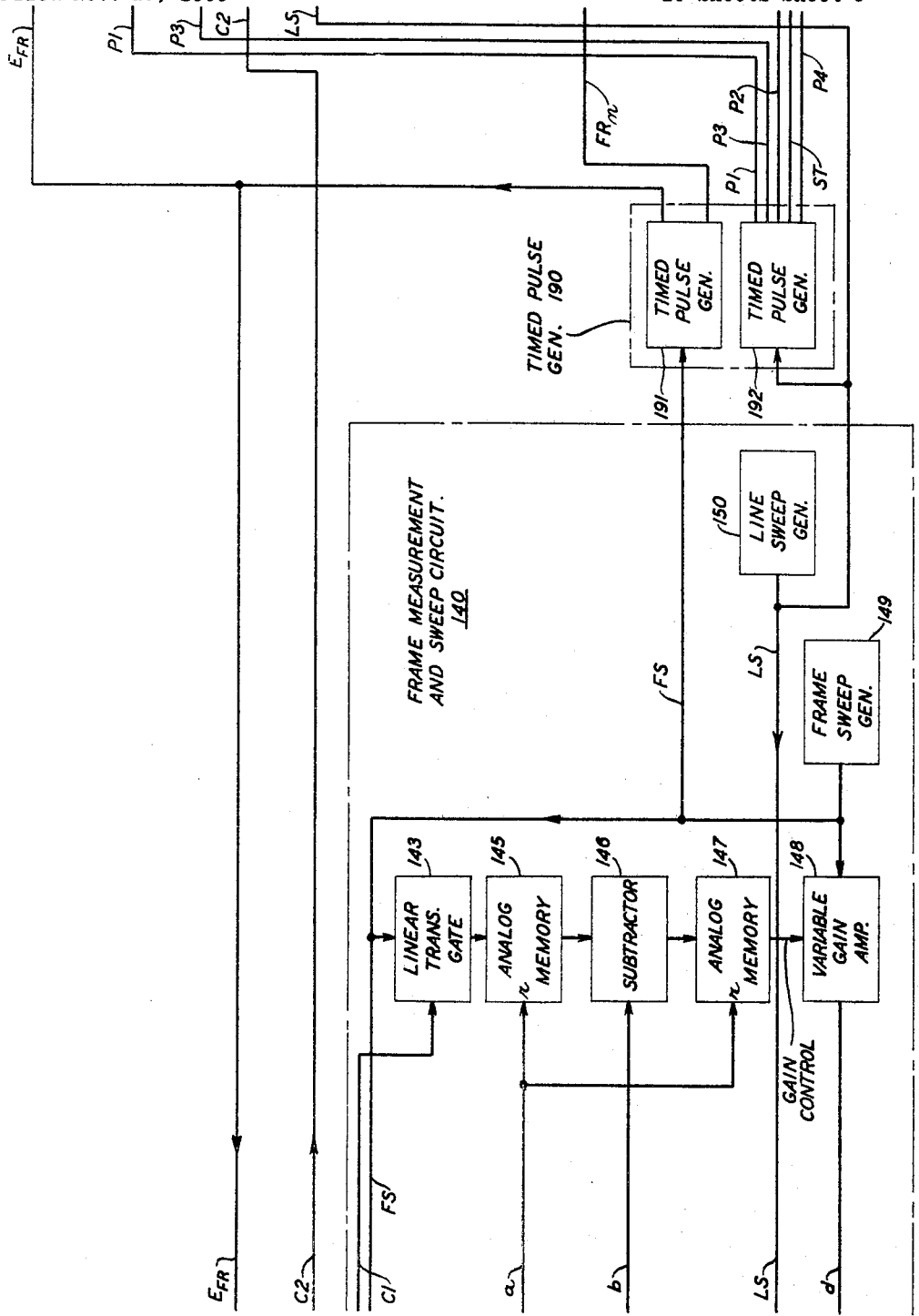

March 24, 1970  R. L. BRASS  3,503,043
APPARATUS FOR INTERROGATING ALPHA-NUMERIC CHARACTERS
Filed Nov. 17, 1960  10 Sheets-Sheet 9

INVENTOR
R.L. BRASS
BY
*G. E. Hirsch Jr.*
ATTORNEY

United States Patent Office 3,503,043
Patented Mar. 24, 1970

3,503,043
APPARATUS FOR INTERROGATING ALPHA-NUMERIC CHARACTERS
Robert L. Brass, Morristown, N.J., assignor to Bell Telephone Laboratories, Incorporated, New York, N.Y., a corporation of New York
Filed Nov. 17, 1960, Ser. No. 69,971
Int. Cl. G06k 9/00
U.S. Cl. 340—146.3
23 Claims This invention relates to pattern recognition and, more particularly, to apparatus for scanning graphic material, such as, for example, geometric figures and alphabetic and numeric characters, and deriving signals therefrom indicative of the general curve formations of such scanned material. It has, as a particularly important object, the improvement of scanning techniques for deriving information relevant to written material only, thus to distinguish written material from dirt specks, smudges, and other extraneous matter not part of the graphic material.

With the advent of "automation," pattern recognition, and particularly the recognition of alphabetic and numeric characters whether, hand-printed or printed by machine, has assumed an important role. To elaborate, fully automatic machines are generally made to act in a given fashion as a result of unique electrical control signals applied thereto. Such control signals may be categorized as the "language" of the machines. A number of important translating steps are required before a machine order, written by a human operator using typical alphabetic and numeric notations, is translated into machine language. Machines for recognizing alphabetic and numeric characters are, therefore, extremely helpful in the over-all automation process, since they provide rapid and automatic reading of instructions written in alphabetic and numeric form and thus may aid in the translation of such instructions into machine language.

Many techniques are known for the recognition of unique geometric configurations and alphabetic and numeric characters. A typical technique determines the general outline of the graphic material under inspection and compares the outline with the outlines of various elements comprising a master set of "standard" graphic material. A best-match is then utilized to classify the material inspected.

In determining the general contour of graphic material as part of the above-mentioned recognition process, it has been found convenient to utilize the well-known flying spot scanning technique. For example, a spot of light is typically made to scan, in a series of line sweeps constituting a frame of such sweeps, an area containing a character to be recognized. A photomultiplier tube, that detects light reflected from the area, is employed to indicate the specific instants that the spot intersects a portion of the character. The positions of the intersections of the beam and the character yield information that is indicative of the general outline of the scanned material.

The present invention has for one important object the improvement of the technique of scanning graphic material and deriving information concerning its general outline. Specifically, one aspect of the invention deals with the problems encountered in scanning any graphic material and deriving information pertinent only to the material itself. To explain further, written graphic material often includes matter which is not pertinent thereto as, for example, smudges of dirt, pencil smudges, ink smudges, and breaks in a written line. These all provide data or the conspicuous lack of data that result, in the case of existing character recognition devices, in an input of extraneous and often misleading information.

This invention overcomes this problem by utilizing a scanning method which has the inherent property of discriminating between extraneous and nonextraneous matter.

Another object of the present invention is to effect the derivation of more complete information concerning the shape of graphic material to be classified. Presently, many scanning techniques involve the examination of graphic material from one direction only, that is, scanning takes place in one coordinate direction. Accordingly, the information derived thereby is necessarily limited.

A further object of the invention is the transformation of information concerning the general shape of graphic material into information indicative of the number and types of basic elemental curves that together form the material.

The techniques employed in the present invention to carry out the above-mentioned and other objects are generally as follows. First, in conjunction with a scanning process using a flying spot scanner, graphic material is scanned, for example, from four different coordinate directions each disposed approximately 90 degrees from each other. The scanning of graphic material from a number of different directions thus provides additional information concerning the basic outline of scanned material and simplifies the classification of the material.

Second, the scanning of graphic material in each of the four directions comprises a two-step process. The first may be characterized as "measurement"; the second as "interrogation." To elaborate, in each of the four scanning directions, the series of line sweeps comprising the first or measurement frame is utilized to measure the height of the graphic material being scanned. Following this measurement frame, the extent of the following series of line sweeps comprising the second or interrogation frame is adjusted to encompass exactly the graphic material without, however, changing the number of line sweeps comprising the frame. In this fashion each line sweep of the interrogation frame, in each of the four directions, is utilized to scan only the graphic material, thus eliminating needless scans above and below this material and preserving the same high scanning line density for all scans.

Each of the interrogation frames may be considered to consist of two portions. The first portion comprises the first $m$ line sweeps in the frame, which may be characterized as "Search and Track." The second portion comprises the remaining $n$ line sweeps in the frame, which may be characterized as "Track." In the Search and Track portion of each interrogation frame, a search is made for the segment of the scanned graphic material that lies closest to the edge of the frame from which the line sweeps commence. This is accomplished by permanently noting the first intersection of the flying spot with any material in the area being scanned. Following this, a "window" effect is utilized in each of the succeeding line sweeps to note only the intersection of the flying spot with graphic material that occurs within a predetermined section of the line sweep; that is, within a window. This predetermined section is of a length $w$ and is determined by the location of the intersection last permanently noted in a previous line sweep. Specifically, the midpoint of the window section is located a distance $d_m$ from the frame edge; $d_m$ being equal to the distance between the frame edge and the intersection last permanently noted. In this fashion, an element of graphic material forming a line segment is "tracked."

At any time during the Search and Track portion of each interrogation frame, should an intersection be detected in a line sweep that lies closer to the edge of the frame than the window section, such an intersection is temporarily noted but not yet considered to be part of the graphic material. The newly detected intersection is considered to be an actual part of the graphic material under inspection only if, for a given number of sequential line sweeps following the present sweep, intersections are temporarily noted in each line sweep within a given distance from the intersection temporarily noted in the previous line sweep. If such intersections are not noted, a return is made to the line formerly tracked and the system continues to track this line. Thus, in the Search and Track portion of an interrogation frame, smudges, specks of dirt, and the like are effectively ignored even though they may lie closer to the frame edge than the intersections currently (permanently) noted, since further intersections in the area of the smudge or speck are not noted for the given number of sequential line sweeps. If, however, such intersections in the newly considered area are noted for the given number of sequential line sweeps, they are considered to be part of a new line and this line itself is tracked as above.

If, during the Search and Track portion of an interrogation frame a line ends that is being tracked, a search is made again in the following line sweeps for the first intersection to be permanently noted, and the above process is repeated. Thus, in this portion of the frame, the segment of a scanned character that lies closest to a particular edge of the frame is ultimately detected.

During the remaining n lines or Track portion of an interrogation frame, the invention provides for the tracking of the continuation of the line segment tracked at the end of the Search and Track portion. A window effect is utilized, as in the Search and Track portion, to note only intersections of the flying spot that occur within the window section of a line sweep as established by the intersection last permanently noted in a previous line sweep. In this fashion, extraneous matter surrounding the element currently tracked is not noted and cannot provide information to be acted upon.

In each of the interrogation frames a further feature is included to account for breaks in a line of graphic material currently being tracked. Unless the breaks themselves continue for a given number of sequential line sweeps, the line is not considered to have ended, and is tracked when it is again encountered within the window section of a line sweep.

At the end of the four complete interrogation frames, one in each of the selected coordinate directions, the entire exterior contour of the graphic material will have been examined. Pertinent information will have been retained for examination, but extraneous matter will have been excluded. This information may be utilized directly to effect a classification of the graphic material by comparing it with information pertinent to standard reference material and detecting a best-match. However, such information also may be transformed into a form suitable for providing an indication of the number of basic curves comprising the graphic material. This is accomplished by examining the first and second derivatives of the signals representing the character after such derivatives have been buffered to exclude information pertaining to temporary transitions between curves. The information concerning the buffered derivatives then may be compared with standard reference information to effect a classification.

Although the invention has been generally described above, a better understanding of it may be obtained by consulting the following detailed description thereof and the appended drawings in which.

Figure 1:
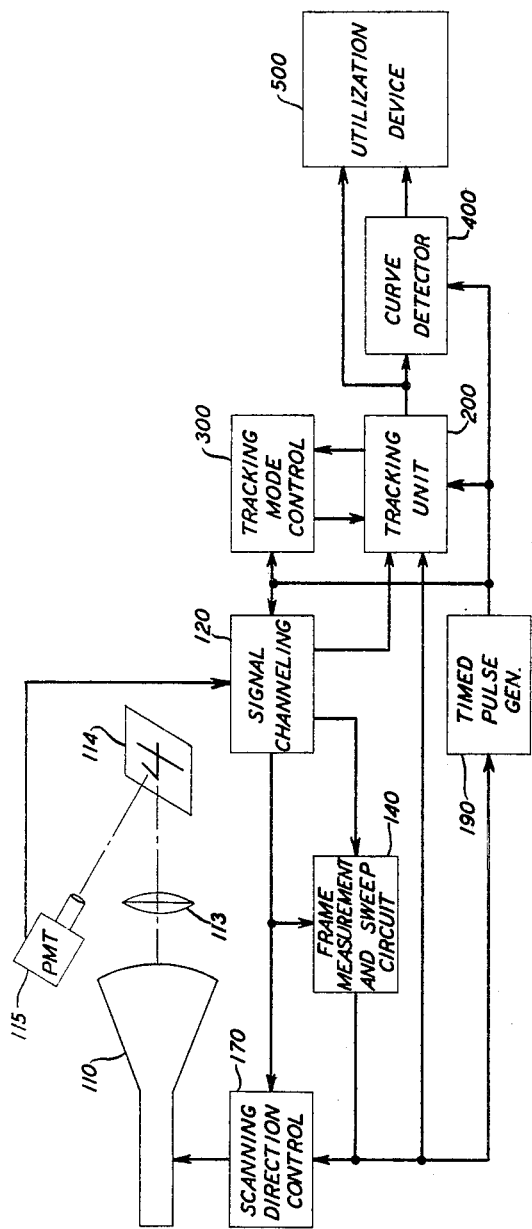
FIG. 1 is a block diagram of apparatus comprising an illustrative embodiment of this invention.
Figure 4A:
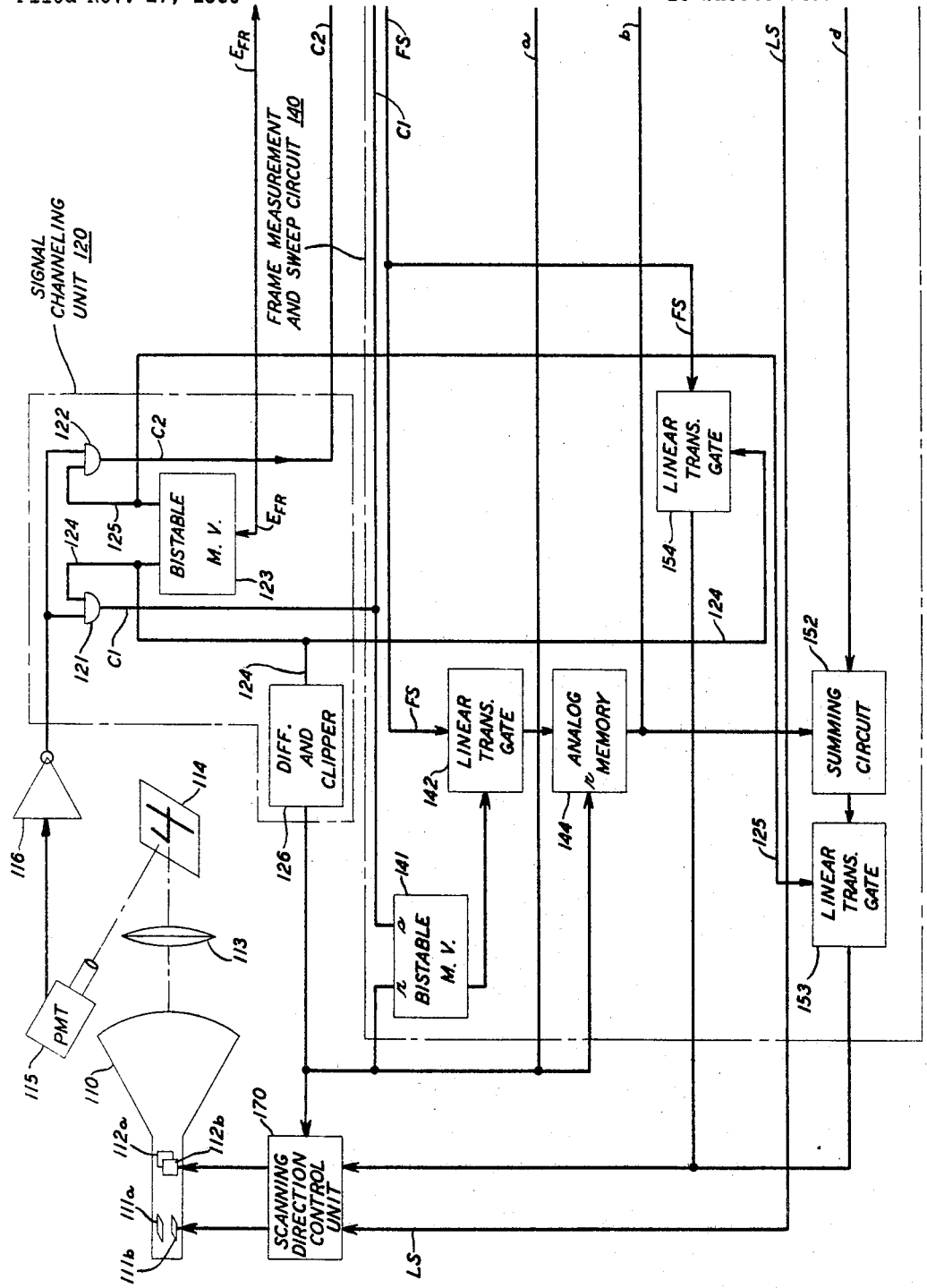
Figure 5:
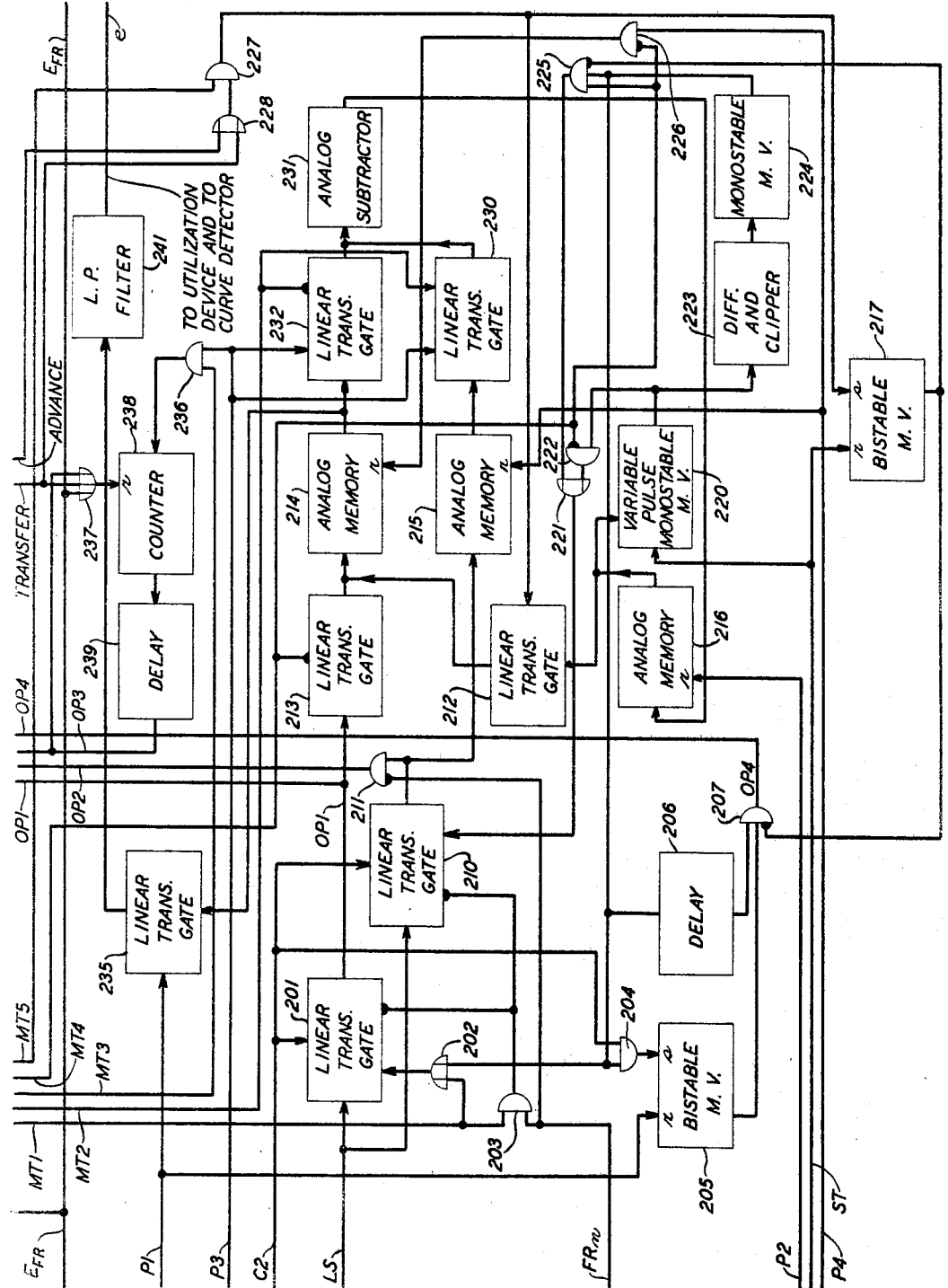
Figure 6:
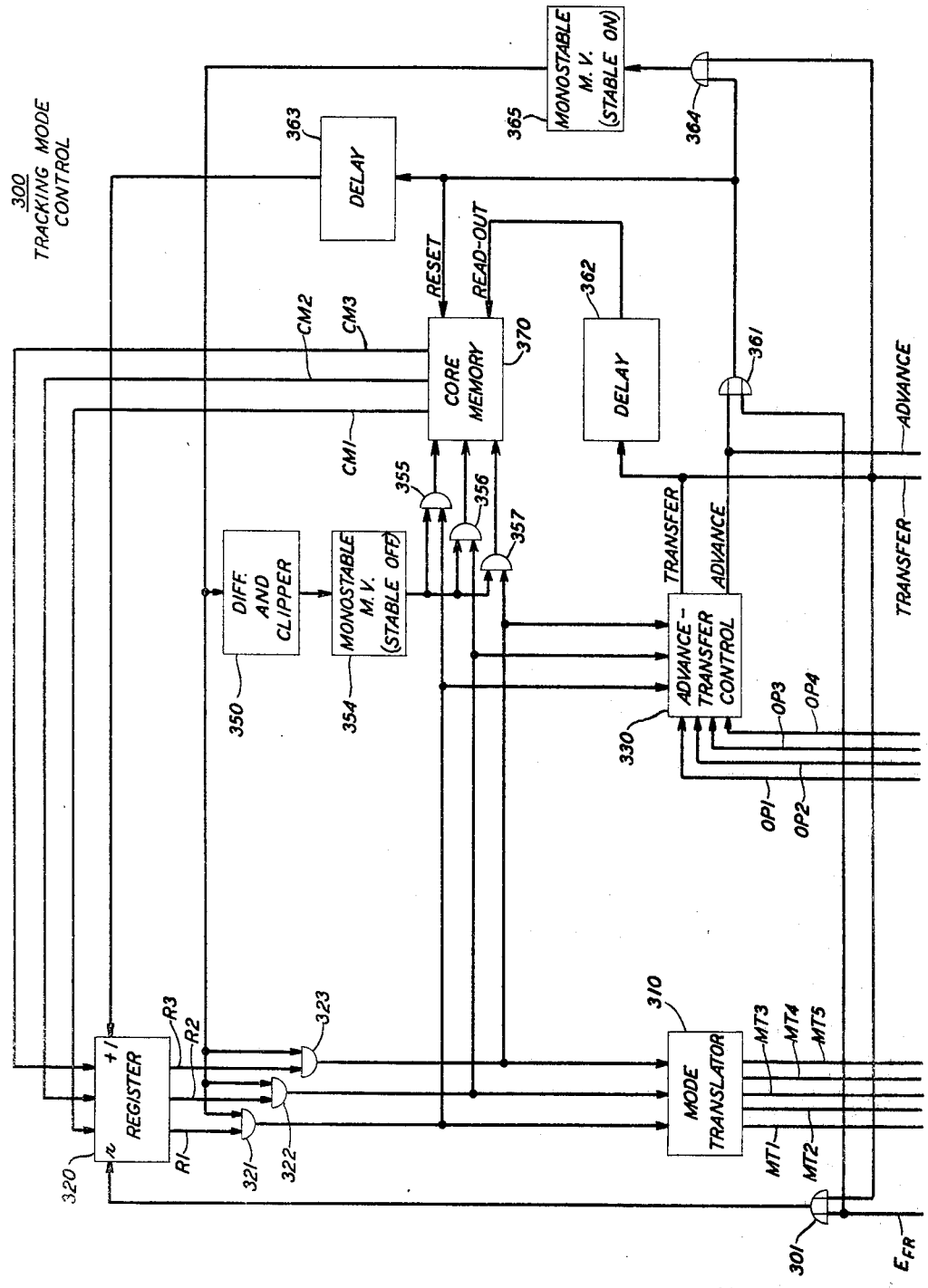
Figure 7:
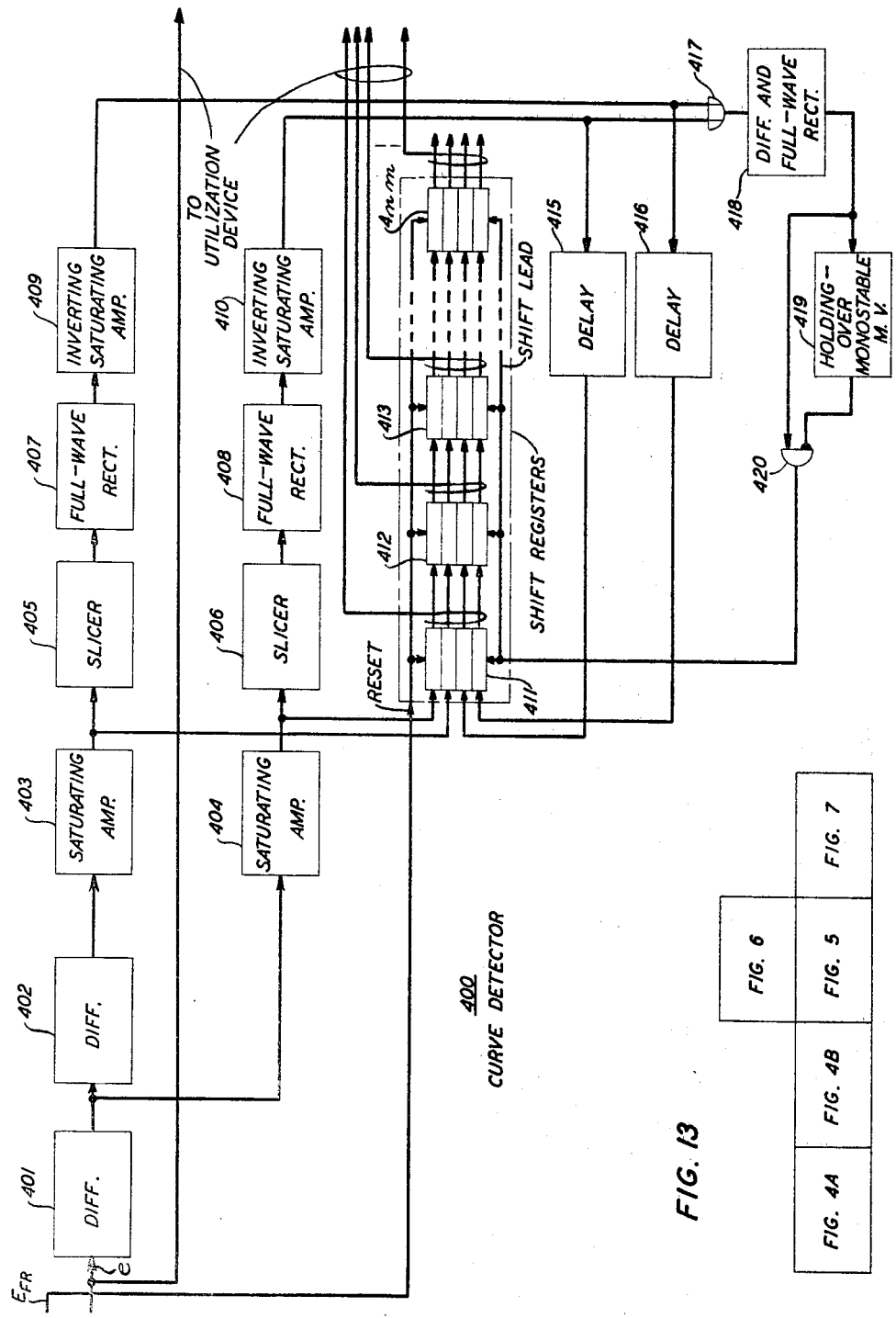
Figure 8:
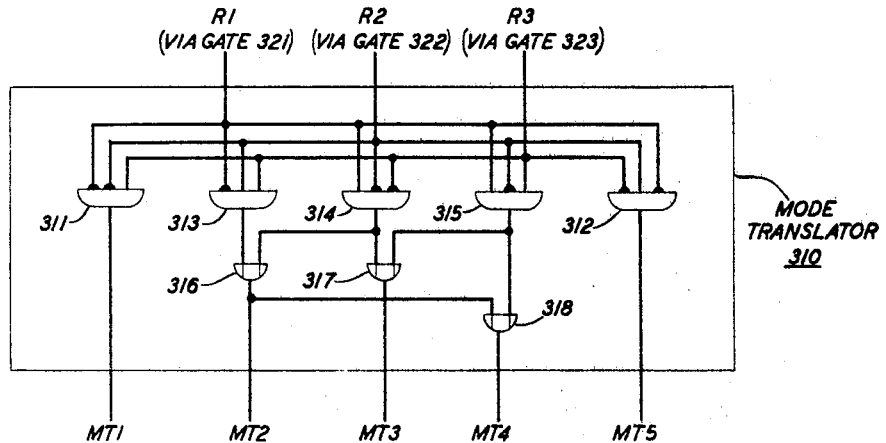
Figure 9:
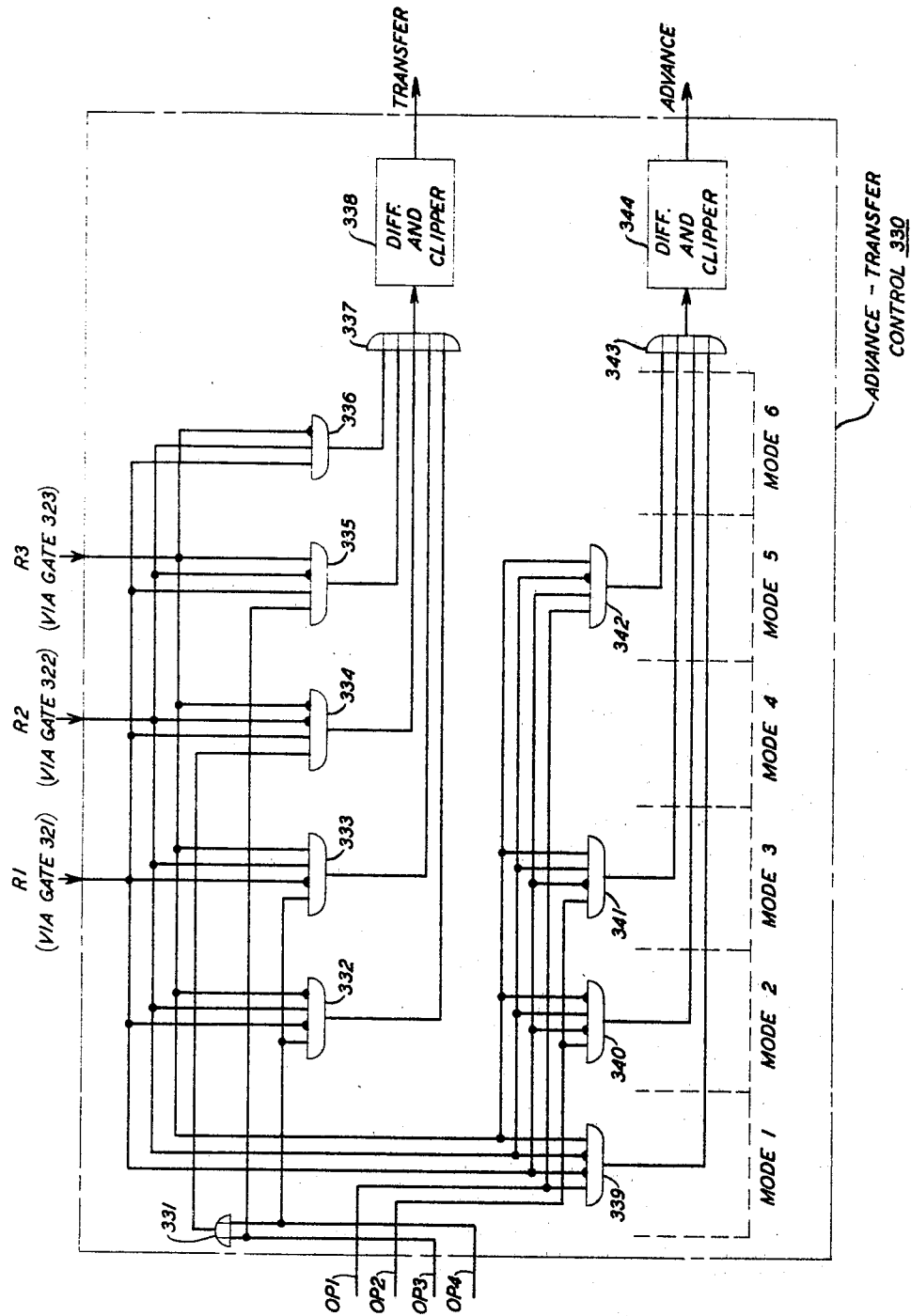

FIG. 4, comprised of FIGS. 4A and 4B, is a detailed block and schematic diagram of the signal channeling unit, the frame measurement and sweep circuit unit, the scanning direction control unit, and the timed pulse generators of FIG. 1;

FIG. 5 is a detailed block and schematic diagram of the tracking unit of FIG. 1;

FIG. 6 is a detailed block and schematic diagram of the tracking mode control unit of FIG. 1;

FIG. 7 is a detailed block and schematic diagram of the curve detector of FIG. 1;

FIG. 8 is a detailed schematic diagram of the mode translator of FIG. 6;

FIG. 9 is a detailed schematic diagram of the advance-transfer control of FIG. 6

Figure 10:
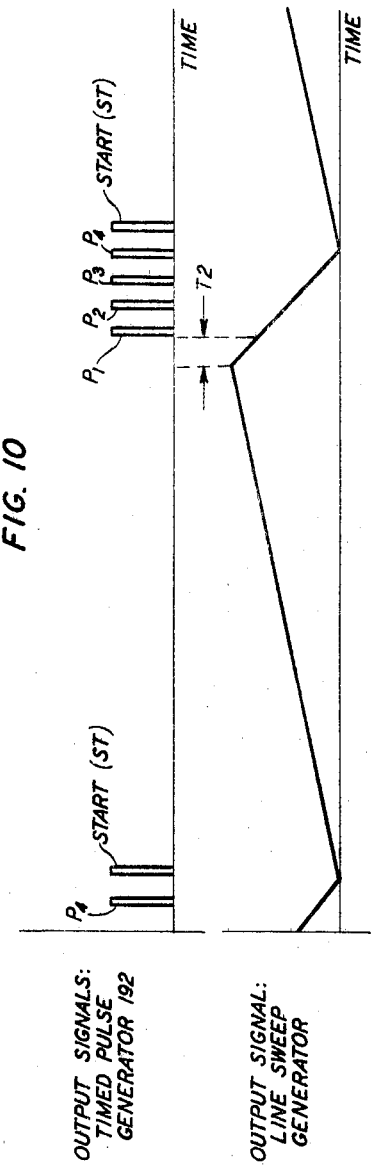
Figures 2, 11:
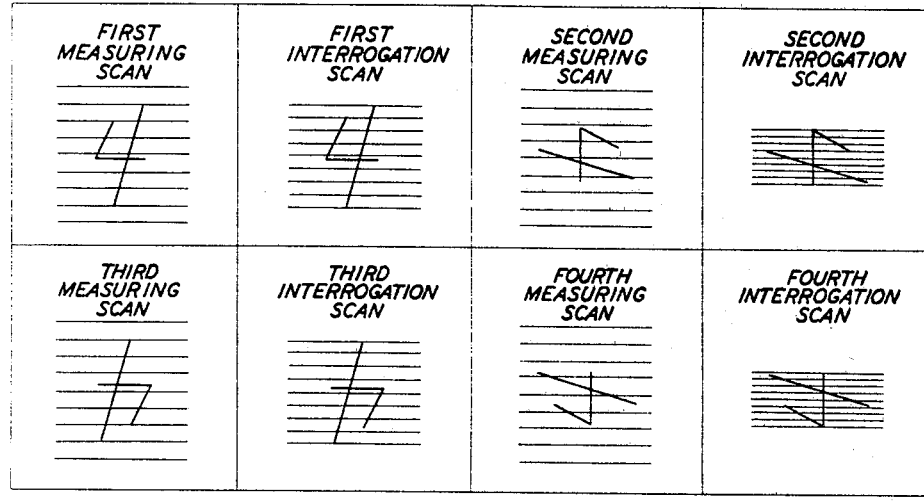
FIG. 2 is an illustration of the scanning techniques employed in this invention.
Figure 12:
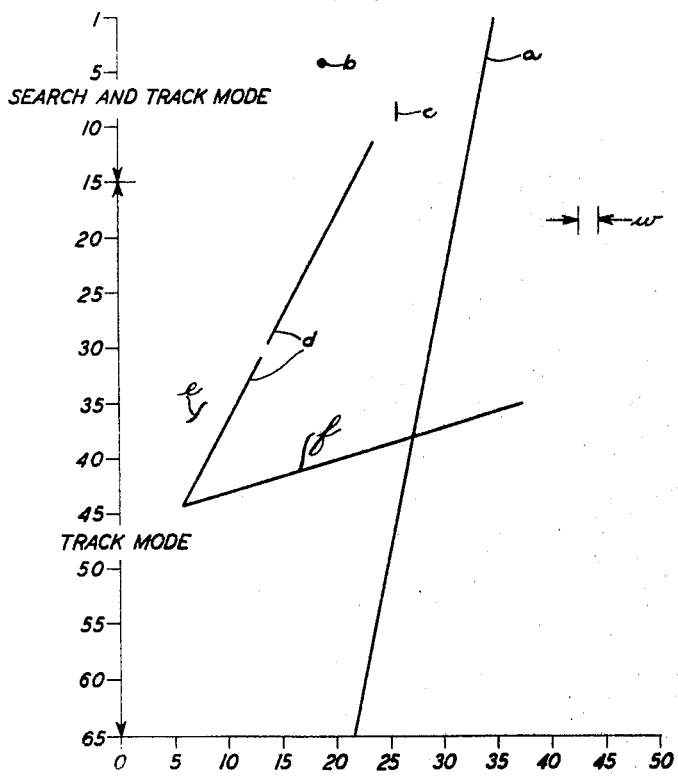

FIG. 10 is a pair of waveform diagrams of the output potentials of the line sweep generator and its associated timed pulse generator of FIG. 4;

FIG. 11 is a logic table for the apparatus shown in FIG. 6;

FIG. 12 depicts a detailed view of a character to be interrogated according to the principles of the invention; and FIG. 13 depicts the placement of FIGS. 4 through 7 in order to provide a complete block and schematic diagram of apparatus embodying the principles of the invention.

GENERAL DESCRIPTION

Referring to FIG. 1, a character to be scanned and identified, for example, the numeral "4," is shown at an area 114 directly in front of the face of a cathode ray tube 110. The beam in the cathode ray tube scans the face of the tube in a series of line sweeps constituting a frame of such sweeps by means of conventional deflection circuits. A lens 113 is utilized to focus upon area 114 the light formed by the impingement of the beam on the face of the tube. Thus, a spot of light is made to scan the area in a series of line sweeps. A photomultiplier tube 115 detects the reflected light from the area containing the numeral and emits a pulse whenever the beam of light intersects either a portion of the character itself or any other material such as dirt, ink smudges, or the like.

Signals from the photomultiplier tube are applied to a signal channeling unit 120. Unit 120, under the control of signals from timed pulse generators 190, channels the signals from the photomultiplier tube alternately, during successive frames of line sweeps of the beam of light, to frame measurement and sweep circuit unit 140 and to tracking unit 200. The latter units provide, respectively, measurement and interrogation of the character.

Measurement

Measurement of the character during a measurement frame is effected in unit 140 by utilizing, for example, the sawtooth potential that provides the frame sweep of the beam. The sawtooth potential is gated by the first and the last photomultiplier tube signals that are received during the frame. Gating of the frame sweep potential by the first photomultiplier tube signal establishes a potential that is proportional to the distance from the top of the frame to the top of the character, if the measurement frame is considered to commence above the upper portion of the character "4," as depicted. Similarly, the last noted photomultiplier tube signal in the measurement frame is used to gate the same frame sweep sawtooth potential to establish a potential whose magnitude is proportional to the distance from the top of the measurement frame to the lower extremity of he character being scanned. The first of the gated sawtooth potentials is used to establish the initial value of the frame sweep sawtooth potential in the following interrogation frame; the difference between the two gated potentials is utilized to establish the extent of the sawtooth. In this fashion, the frame sweep sawtooth potential is modified in the following interrogation frame so that the frame just encompasses the scanned character.

Multidirectional scanning

The unmodified and modified frame sweep potentials, as well as the line sweep potential, are supplied to a scanning direction control unit 170, which in turn channels the signals to the deflection mechanism, for example, plates of cathode ray tube 110. However, under control of the signal channeling unit 120, the scanning direction control unit causes the direction of scanning to shift by 90 degrees after every interrogation frame. This is accomplished, for example, by applying the unmodified and modified frame sweep potentials to the vertical deflection plates and the line sweep potential to the horizontal deflection plates during the first two frames, and then switching these potentials during the next two frames to apply the frame sweep potentials to the horizontal deflection plates and the line sweep potential to the vertical deflection plates. By thus shifting the frame sweep and line sweep potentials after every interrogation frame, the graphic material under inspection is effectively rotated so that it is scanned with a measurement frame and an interrogation frame in each of four different directions, for example, disposed 90 degrees from each other. FIG. 2 depicts the scanning of the numeral "4" in four different orientations.

Interrogation

During the interrogation frame in each orientation, signal channeling unit 120 channels the signals from photomultiplier tube 115 to tracking unit 200. The line sweep potential is also supplied as an input to the tracking unit from the frame measurement and sweep circuit unit 140. The position of the beam in any line sweep when an intersection occurs with the character under inspection is detected in the tracking unit by utilizing the signal from the photomultiplier tube as a gate for the line sweep potential. In this fashion, the tracking unit develops a series of potentials corresponding to the distance from the edge of the frame to the beam position at various instants. The tracking unit, however, is under control of signals from timed pulse generators 190 and also the tracking mode control unit 300. Unit 300 is supplied with signals from the tracking unit and from the timed pulse generators, and provides control signals for the tracking unit that dictate the mode of tracking. In this fashion, the tracking unit only notes certain of the intersections of the beam of light with the graphic material under inspection. Particularly, during the first $m$ line sweeps constituting the Search and Track portion of an interrogation frame, the tracking unit searches for the portion of the character scanned that lies closest to the edge of the frame from which the line sweeps commence, and notes only intersections pertaining thereto. In the remaining Track portion of the frame, only intersections that pertain to the portion of the character settled upon in the first part of the frame are noted until either the frame ends or the line being "tracked" ends.

Figure 3:
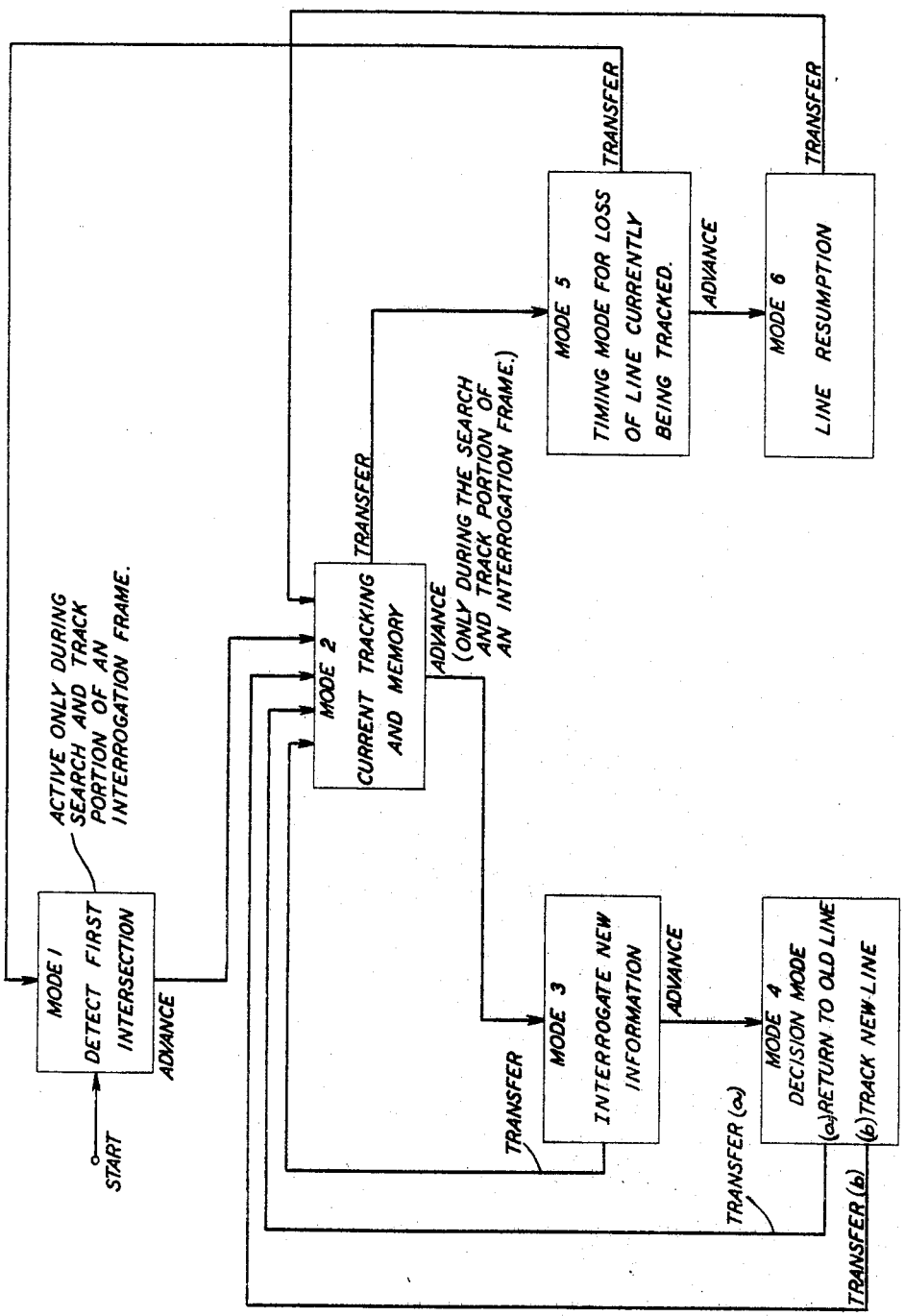
FIG. 3 is a functional block diagram illustrating the modes of operation of the apparatus of FIG. 1 during the interrogation scans.

FIG. 3 is a functiontl block diagram showing the various modes of tracking. As an aid to understanding the tracking modes, FIG. 12 should be referred to in conjunction with FIG. 3. FIG. 12 depicts, in detail, the numeral "4" which is to be scanned and from which information is to be derived concerning its general shape. It is assumed that the interrogation frame of line sweeps extends from the top of the numeral to the bottom of the numeral and, furthermore, that the frame is composed of 65 scanning lines which proceed from left to right in the figure. The first 15 scanning lines constitute the Search and Track portion of the frame, while the remaining scanning lines constitute the Track portion. It should be noted that the division of the frame in this fashion is purely arbitrary and the invention is not limited to the division shown. FIG. 12 is also supplied with a series of vertical lines numbered 0 to 50 to provide a set of coordinates to aid in designating various portions of the numeral "4." For example, the small dot designated $b$ appears at the intersection of the fourth scanning line and the nineteenth vertical line.

Mode 1

As shown in FIG. 3, the tracking unit is established in mode 1 at the commencement of an interrogation frame. Mode 1, which is active only during the Search and Track portion of the frame, provides for the detection, in any line sweep of the first intersection of the flying spot with matter appearing in the area scanned. Thus, in the first line sweep, an intersection with the portion of the numeral designated $a$ is noted at the thirty-fifth vertical line. Once the first intersection is noted, an advancement is made from mode 1 into mode 2.

Mode 2

Mode 2 is the current tracking mode and memory mode of the tracking unit. Mode 2 establishes the window section in each line sweep as previously explained. That is, in mode 2 the tracking unit is gated to receive information in any line sweep only if it occurs within a given section of the line sweep established by the intersection last noted in a previous line. For the purpose of illustration only, this section is indicated in FIG. 12 as being of length $w$. The midpoint of the window section of each line is located a distance $d_m$ from the left-hand frame edge; $d_m$ being equal to the distance between the frame edge and the intersection last noted in a previous line sweep. So long as an intersection in each of the succeeding line sweeps falls within the window section of the line sweep, the tracking unit remains in mode 2 and records all such intersections. From FIG. 12 it may be seen that each of the intersections of the scanning beam with the line $a$ in the second and third line sweeps satisfies this criterion.

During the Search and Track portion of an interrogation frame, if a new intersection is detected that lies closer to the frame edge than the window section, an advancement is made from mode 2 into mode 3. Such an intersection takes place, for example, in the fourth scanning line as the scanning beam intersects the dot designated $b$, and also in the eighth scanning line when an intersection is detected with the mark designated $c$.

Mode 3

Mode 3 is a transitory timing mode which examines, on the next succeeding line sweep, the new information. If another intersection is not detected in the next line sweep within distance $w/2$ on either side of the newly detected intersection of the previous line sweep, the tracking unit transfers from mode 3 into mode 2. With such a transfer, the element previously tracked continues to be tracked. In FIG. 12 it may be seen that on the fifth scanning line no intersection is detected within distance $w/2$ from the dot $b$. Thus, the tracking unit transfers from mode 3 into mode 2, and the portion of the numeral designated $a$ is again tracked as soon as the intersection occurring at the thirty-fourth vertical line in the sixth line sweep is detected by the tracking unit. If, however, while in mode 3, another intersection is detected in the next line sweep within the distance $w/2$ from the newly detected intersection of the previous line sweep, such as the intersection in the ninth scanning line with the mark $c$, the tracking unit advances from mode 3 into mode 4.

Mode 4

Mode 4 has two transfer orders associated with it. The first transfer order is initiated in the event that the new intersections being interrogated in his mode do no fall within the window section in each line sweep of a given number of sequential line sweeps, for example, three sequential line sweeps. This indicates that the new intersections detected pertain only to smudges, ink specks, or the like. In such a case, a transfer is made into mode 2 and the line segment previously tracked in mode 2 is tracked once again. As may be seen from FIG. 12, no intersection is detected on the tenth line sweep that lies within the distance $w/2$ on either side of the intersection with the mark $c$ noted in the ninth line sweep. Thus, a transfer is made from mode 4 into mode 2 so that the tracking unit detects the intersection with the line *a* in the eleventh line sweep. If, however, while in mode 4, new intersections are noted within the window section of each of the given number of sequential line sweeps, the new intersections are considered to be part of a new element of the character. In this case, the second transfer order of mode 4 is initiated and the tracking unit transfers from mode 4 into mode 2 and the new line is tracked. Such a second transfer order in mode 4 occurs, for example, after the portion of the numeral designated *d* is detected on the twelfth line sweep lying closer to the frame edge than the line *a* currently being tracked. Since *d* is a continuous line segment, once the unit advances into mode 4 after the intersection is noted in the thirteenth line sweep at the twenty-third vertical line, intersections within the window sections are detected in each of the next three sequential line sweeps. Thus, when transfer occurs to mode 2, the new intersections with line *d* are detected, while the intersections with the line *a* are ignored.

Modes 5 and 6

Modes 5 and 6 are utilized to interrogate line endings and gaps or breaks in line segments. Specifically, a transfer is made from mode 2 into mode 5 if an intersection is not noted in the window section of a line sweep and if an advancement has not already taken place from mode 2 into mode 3. In mode 5, the lack of detected intersections is timed for a number of sequential line sweeps, for example, three line sweeps. Referring to FIG. 12, such a transfer from mode 2 into mode 5 occurs in the thirtieth line sweep of the beam, where a break occurs in the line *d*, and also in the forty-sixth line sweep, where the line *d* being tracked ends. If, while in mode 5, an intersection is again noted within the window section of a line sweep before the given number of sequential line sweeps have passed, as is the case of the break in the line *d*, an advancement is made into mode 6. Mode 6 is a transfer mode which immediately transfers the tracking unit into mode 2, and the line is again tracked. However, if, while in mode 5, the given number of sequential line sweeps pass without the line being encountered again, such as occurs with line *d* after the forty-fifth line sweep, a transfer is made from mode 5 into mode 1. In this respect it should be noted that mode 1 is active only during the Search and Track portion of an interrogation frame. Thus, if a break in the line occurs in this portion of the frame, the transfer into mode 1 initiates a repetition of the entire procedure outlined above in a search for the element of the scanned character lying closest to the frame edge. However, if a transfer is made from mode 5 into mode 1 in the Track portion of an interrogation frame, such as occurs when the line *d* ends, the tracking unit is inoperative and indicates that the line has ended that was tracked in mode 2.

Curve detection and utilization

In the above fashion, signals are derived indicative of the general outer shape of the scanned graphic material. Returning to FIG. 1, the signals from the tracking unit 200 are applied to a curve detector 400 and a utilization device 500. Within the curve detector, the signals from the tracking unit are operated upon so as to characterize the graphic material under inspection in terms of various basic curve segments. Specifically, by determining the first and second derivatives of the signals, the graphic material is completely characterized, since any curve may be defined in terms of its derivatives. This form of characterization has the advantage of being independent of the relative size of the character scanned. Furthermore, by imposing the requirement that a derivative must remain unchanged for a given period of time before it is accepted as meaningful information, meaningless transitions between curves and erratic changes in curves, characterized by rapidly changing derivatives, are appropriately ignored.

Output signals from the curve detector as well as the signals from the tracking unit are applied to utilization device 500. Within the utilization device, either set of signals is utilized to effect a classification of the scanned material, for example, through the well-known procedure of comparison and best-match with similar stored information pertaining to reference materials. Such stored information, for example, may consist of signals from either the tracking unit or the curve detector obtained from a previous scanning of standard, reference material.

DETAILED CIRCUIT DESCRIPTION

Reference will now be made to FIGS. 4 through 7 to describe in detail the apparatus that is broadly depicted in FIG. 1. FIG. 13 shows the placement of these figures to represent a continuous system for carrying out an functions except utilization. Referring to FIG. 4, signals from the photomultiplier tube 115, which consists of negative-going pulses every time the scanning beam from the flying spot scanner intersects a portion of the graphic material being scanned, are amplified in an amplifier 116. Conveniently, this amplifier provides an output signal which differs in phase from its input signal by 180 degrees; thus, the pulses are transformed into positive-going pulses. The series of positive-going pulses are applied to signal channeling unit 120 which channels the signals alternately, during successive frames, to frame measurement and sweep circuit unit 140 and to tracking unit 200. The channeling of signals will first be considered.

Signal channeling

Signal channeling unit 120 is under the control of pulses from timed pulse generators 190. Specifically, generator 191, whose input is derived from frame sweep generator 149, provides a pulse at the end of each frame. The end-of-frame pulse appears upon the lead designated $E_{FR}$ and is applied to the trigger input of a bistable multivibrator 123. Each end-of-frame pulse causes the multivibrator to change its state. Thus, each of the output leads 124 and 125 from the multivibrator is alternately energized during successive frames.

Leads 124 and 125 are coupled to a pair of coincidence gates 121 and 122, respectively. Also applied to the inputs of the gates are the signals from amplifier 116. Conveniently, these gates comprise typical binary coincidence gates, each providing an output signal only when all of the inputs thereto are energized. Thus, for example, during a measurement frame, lead 124 is energized, and, for each pulse generated by amplifier 116, an output pulse appears upon lead C1 from gate 121 and is applied to the frame measurement and sweep circuit unit 140. At the end of a measurement frame, the end-of-frame pulse triggers multivibrator 123 so that, during the following interrogation frame, lead 125 is energized. During the following interrogation frame, pulses from amplifier 116 cause pulses to appear on lead C2 from gate 122, and these latter pulses are applied to the tracking unit 200 of FIG. 5. In this fashion, pulses from amplifier 116 are "channeled," during alternate frames, to the frame measurement and sweep circuit unit 140 and to the tracking unit 200.

Character measurement

During each measurement frame, as amplified signals from photomultiplier tube 115 are channeled to the frame measurement and sweep circuit unit 140, the flying spot scans the entire area 114, and the graphic material printed thereon is measured in the frame sweep direction. The information obtained thereby is utilized in the subsequent interrogation frame to alter the size of the frame to encompass exactly the scanned material. This is accomplished in the following fashion.

Just before the commencement of a measurement frame, that is, at the end of the previous frame, an end-of-frame pulse appears from the timed pulse generator 191 which triggers multivibrator 123 so that lead 124 is energized during the measurement frame. Lead 124 is connected to coincidence gate 121, to differentiator and clipper 126, and to the gating input of linear transmission gate 154. Upon the energization of lead 124, differentiator and clipper 126 emits a pulse which triggers the scanning direction control unit 170 and resets a bistable multivibrator 141 and analog memories 144, 145, and 147. Due to the clipping action of circuit 126, no pulse is generated upon the de-energization of lead 124. The actions of components 126, 170, 144, 145, and 147 will be described hereinafter. First consider, however, the action of linear transmission gate 154, which has applied thereto via lead FS an unmodified signal from the frame sweep generator 149. Such a gate is typically one similar to that described in Millman and Taub, "Pulse and Digital Circuits," Sec. 14–5 (1956). The output signal from the gate is zero except upon the application thereto of a gating signal, at which time the output signal is a reproduction of the applied input signal. Thus, during each measurement frame at which time lead 124 is energized and a gating signal is applied to gate 154, the unmodified frame sweep signal is passed by lead FS through the transmission gate and thence to scanning direction control unit 170. From the scanning direction control unit the unmodified frame sweep sawtooth potential is applied to one set of deflection plates of cathode ray tube 110. By a proper pre-selection of the unmodified sawtooth magnitude, the flying spot is made to scan the entire extent of area 14 during the measurement frame.

Actual measurement of a character during the measurement frame is effected as follows. Lead C1 from gate 121 is connected to the "set" input of bistable multivibrator 141 and to the gating input of a linear transmission gate 143. The output of multivibrator 141, which is energized when the multivibrator is in the reset state, is connected to the gating input of linear transmission gate 142. Applied to the transmission input of gate 142 via the lead FS is the frame sweep signal from frame sweep generator 149. As explained before, multivibrator 141 is reset by a pulse from differentiator and clipper 126 which occurs at the end of the frame just prior to a measurement frame. Thus, during a measurement frame, until a pulse appears upon lead C1 setting multivibrator 141, transmission gate 142 gates the frame sweep sawtooth potential to analog memory 144. This memory unit may comprise, for example, a peak detector. When the first pulse appears upon lead C1, indicating the first intersection of the flying spot with the graphic material on area 114, multivibrator 141 is set. This action results in the disabling of linear transmission gate 142. Thus, the frame sweep potential is no longer gated into analog memory 144, and the memory contains a potential which is proportional to the distance from the top of the area 114 to the point at which the first intersection of the flying spot with the material written on the area is noted. In this respect it is assumed, for the purpose of illustration only, that the frame sweep proceeds from the top to the bottom of area 114, as is shown in FIG. 2, during the first measuring scan. Since multivibrator 141 is not reset until after the following interrogation frame, analog memory 144 retains this potential during the remainder of the current measurement frame and for the entire following interrogation frame. The output potential from analog memory 144 is applied both to a subtractor 146 and to one input of a summing circuit 152.

Lead C1 is connected to the gating input of linear transmission gate 143. Applied to the transmission input of the gate via lead FS is the frame sweep sawtooth potential from frame sweep generator 149. Each time a pulse appears upon lead C1, indicating an intersection of the flying spot with matter on the area 114, the frame sweep potential is gated into analog memory 145. Since gating of the frame sweep potential continues until pulses no longer appear on lead C1, the final potential gated into memory 145 is proportional to the distance from the top of the area 114 to the bottom of the graphic material interrogated. The output signal from analog memory 145 is applied to subtractor 146 to which the signal from analog memory 144 is also applied. An output potential is produced by the subtractor that is equal to the difference between the two input signals, that is, it is proportional to the extent of the interrogated graphic material in the frame sweep direction. The output signal from the subtractor is applied to analog memory 147 whose output is connected to the gain control circuit of a variable gain amplifier 148. Applied to the input of amplifier 148 on the lead FS is the output signal from frame sweep generator 149. The magnitude of the frame sweep potential is accordingly adjusted within amplifier 148 according to the magnitude of the gain control potential supplied from analog memory 147. The output of the variable gain amplifier is applied to summing circuit 152 where it is added to the signal from analog memory 144. Accordingly, the output signal from the summing circuit is an adjusted sawtooth potential with an initial value such that the scanning beam is initially positioned at one limit of the graphic material on the area 114. The magnitude of the sawtooth potential is sufficient to ensure that the extent of the frame sweep of the beam just encompasses the scanned material. Such a sawtooth potential is applied to the transmission input of a linear transmission gate 153, whose gating input is connected to lead 125 from multivibrator 123. Thus, in the interrogation frame immediately following the measurement frame, as lead 125 is energized, gate 153 is enabled to pass the adjusted frame sweep sawtooth potential to the scanning direction control unit 170. In this fashion, during an interrogation scan, the frame sweep of the flying spot just encompass the scanned material.

In addition to reducing the extent of a frame, the signal from the gate 153 may be utilized to control the density of the scanning beam. Thus, as the frame size is reduced, the density of the electron beam also may be reduced to prevent the overlapping of line scans.

Multidirectional scanning

The present invention utilizes a multidirectional scan which is effected by the scanning direction control unit 170 in the following manner. Control unit 170 has applied thereto, respectively, the potentials responsible for the line sweep and frame sweep of the flying spot across the area 114. Line sweep generator 150 is coupled directly to unit 170; whereas the frame sweep potential is alternately derived from the frame sweep generator 149 via gate 154 during measurement frames and from the variable clamping circuit 152 via gate 153 during interrogation frames. Unit 17 is controlled by a pulse from differentiator and clipper 126 which occurs each time multivibrator 123 is triggered to energize lead 124. Since the multivibrator is triggered at the end of every other frame sweep, that is, at the end of each interrogation frame sweep, a measurement frame and an interrogation frame are completed before scanning direction control unit 170 is pulsed.

Unit 170 may comprise, for example, a stepping relay such as is shown in Keister, Ritchie and Washburn "The Design of Switching Circuits," chapter 9, (1951). Such a relay, whose contacts are stepped to successive positions as its control circuit is energized by control pulses, for example, supplied from differentiator and clipper 126, operates to pass the frame sweep sawtooth potential alternately, during successive steps, to vertical deflection plates 111 and horizontal deflection plates 112. Similarly, the line sweep potential is alternately passed to the horizontal deflection plates and to the vertical deflection plates during the same successive steps. By utilizing four stepping positions, each one of the deflection plates 111a, 111b, 112a, and 112b is employed during various frames to provide the frame sweep and the line sweep of the electron beam. Thus, an effective 90 degree rotation of the character upon the area 114 is effected after each pair of measurement and interrogation frames.

Interrogation

A detailed explanation will now be given of the operation of the circuitry utilized in the interrogation frames; namely, the tracking unit 200 of FIG. 5, the tracking mode control unit 300 of FIG. 6, and the curve detector 400 of FIG. 7. During each of the interrogation frames, amplified signals form photomultiplier tube 115 of FIG. 4 are passed through coincidence gate 122 to lead C2 which passes to the tracking unit 200. The tracking unit, which utilizes both analog and digital techniques, is controlled in its operation by the tracking mode control unit 300. The explantation of this latter unit, which is entirely digital in its operation, will first be given.

Tracking mode control

The tracking mode control unit supplies output signals from a mode translator 310 via the leads desigted MT1 through MT5. These leads are connected to the tracking unit 200, and in dependence on the leads that are energized, the mode of operation of the tracking unit is determined. FIG. 11 shows the leads that are energized during the various tracking modes. For example, in mode 1, lead MT1 is energized; in mode 3 leads MT2 and MT4 are energized; in mode 6 none of the leads are energized.

The input signals applied to mode translator 310 are derived from a register 320 via coincidence gates 321, 322, and 323, respectively. Register 320, by virtue of the states of energization of its output leads R1, R2, and R3, determines the output leads from the mode translator that are energized. The tracking mode is established accordingly. For example, referring to FIG. 11, to establish mode 1, lead R3 is energized while leads R1 and R2 are not; to establish mode 2, lead R2 is energized while leads R1 and R3 are not.

As noted in conjunction with FIG. 3, there are six modes of tracking. The manner in which a change is made from one mode to another is either by *advancement,* for example, by advancing from mode 1 into mode 2, or by *transfer,* for example, by transferring from mode 6 into mode 2. The transfer and advance operations of tracking mode control unit 300 are dictated by an advance-transfer control 330. Applied to control 330 are a series of signals from tracking unit 200 which appear upon leads OP1, OP2, OP3, and OP4. Also applied to control 330 are signals from register 320 via gates 321, 322, and 323. Depending upon the current mode of operation, that is, the state of the register, various signals upon leads OP1 through OP4 cause control 330 to provide a pulse output signal upon either a transfer lead or an advance lead. FIG. 11 shows, for the various modes, the lead that is pulsed for a particular signal upon an OP lead. For example, in mode 1 an advance pulse is generated if a signal appears upon lead OP1; in mode 4 a transfer pulse is generated if a signal appears upon either of leads OP3 or OP4.

A detailed explanation of the manner in which control unit 300 establishes itself in mode 1 at the beginning of an interrogation frame and the manner in which the unit transfers or advances from one mode into another follows.

(A) INITIAL ESTABLISHMENT OF MODE 1

Prior to an interrogation frame, that is, at the end of the previous measurement frame, an end-of-frame pulse appears upon lead $E_{FR}$ from timed pulse generator 191 of FIG. 4. This pulse is applied to an OR gate 301, whose output is energized upon the energization of any one of its inputs. The output of gate 301 is coupled to the reset input of register 320. Thus, the end-of-frame pulse results in the resetting of the register, after which the register's output leads R1, R2, and R3 are in the states 0, 0, and 0, respectively, where 0 denotes the state of non-energization.

The end-of-frame pulse also energizes another OR gate 361, whose output is connected to the reset input of a core memory 370. Upon being reset, the core memory is cleared of all information stored therein. The output of gate 361 is also connected to another OR gate 364 which, upon energization, triggers a monostable multivibrator 365. The multivibrator, whose stable state is that of energization of its output, is thus triggered to its unstable "off" state. The output of the multivibrator is coupled to a differentiator and clipper 350 and to coincidence gates 321, 322, and 323. Accordingly, when multivibrator 365 is triggered to its unstable "off" state, gates 321, 322, and 323 each lack an enabling input signal, and thus the output leads R1, R2, and R3 from register 320 are isolated from the rest of the circuit of FIG. 6.

During the time in which the output leads from the register are isolated, the signal from OR gate 361, after being delayed by a delay unit 363, is applied to the +1 input of register 320. A binary 1 is thus added to the contents of register 320, which may comprise, for example, a binary chain counter as described in Millman and Taub, page 323 supra. Since the register was previously reset to zero by the end-of-frame pulse, the states of leads R1, R2, and R3 are 0, 0, and 1, respectively, corresponding to mode 1 as shown in FIG. 11.

When multivibrator 365 returns to its "on" or stable state, coincidence gates 321, 322, and 323 are enabled and pass the output signals from register 320. The return of multivibrator 365 to its "on" state also results in a pulse being emitted from differentiator and clipper 350. The clipping action of unit 350 ensures that such a pulse is generated only when the multivibrator returns to its stable state. The pulse from the differentiator and clipper is applied to a monostable multivibrator 354 which is triggered to its unstable "on" state. Triggering of multivibrator 354 results in the enabling of coincidence gates 355, 356, and 357 that permit the output signals from gates 321, 322, and 323 to pass into core memory 370. Accordingly, the input signals applied to the core memory correspond to the output signals from register 320, and the memory is established in mode 1. In this respect it should be noted that multivibrator 354 is "on" only long enough to permit the information contained in the register to be "read" into the core memory.

Information stored in the register is also passed via gates 321, 322, and 323 to mode translator 310, the detailed circuit for which is included in FIG. 8. As explained previously, translator 310 provides energization of leads MT1 through MT5 for the various operational modes. Thus, in mode 1 when the states of register leads R1, R2, and R3 are 0, 0, and 1, respectively, coincidence gate 311 only is enabled, and output lead MT1 is energized.

(B) ADVANCEMENT OR TRANSFER FROM ONE MODE TO ANOTHER

Advancement or transfer from one mode to another is controlled by advance-transfer control 330, the detailed schematic diagram for which is included in FIG. 9. Information on leads R1, R2, and R3 from register 320 of FIG. 6 is applied to control 330 together with information on leads OP1, OP2, OP3, and OP4 from tracking unit 200 of FIG. 5. FIG. 9 is provided with dashed line dividers to show the coincidence gates utilized in the various modes of operation. For example, coincidence gates 332 and 340 pertain to mode 2 while gates 335 and 342 pertain to mode 5. As may be seen from the figure, coincidence gates 332 through 336 establish transfer orders via OR gate 337, whereas coincidence gates 339 through 342 establish advance orders via OR gate 343.

Operation of the apparatus of FIG. 9 is summarized in FIG. 11. For example, referring to FIG. 11, in mode 2 an advance order is established if a signal appears upon lead OP2, and a transfer order is generated if a signal appears upon lead OP4. This is verified by noting in FIG. 9 that in mode 2, as the states of energization of the leads R1, R2, and R3 enable gates 332 and 340, a pulse appearing upon lead OP2 results in an output pulse from gate 340. Such a pulse is sufficient to establish an advance order. Similarly, a pulse appearing upon lead OP4 results in an output pulse from gate 332 that is sufficient to establish a transfer order.

Whenever one of the output leads from coincidence gates 332 through 336 is energized, the output of OR gate 337 is likewise energized, and differentiator and clipper 338 provides an output pulse, in this case a transfer pulse. By providing a clipping action, pulses are not produced upon de-energization of any one of the leads. In similar fashion, differentiator and clipper 344 produces an advance pulse whenever any one of the output leads from coincidence gates 339 through 342 is energized, resulting in energization of the output from OR gate 343.

(1) *Advancement.*—Referring once again to FIG. 6, the appearance of an advance pulse from control 330 results in the resetting of core memory 370, the triggering of monostable multivibrator 365 to its unstable "off" state, and the application of a pulse to the +1 input of register 320 in exactly the same fashion as occasioned by an end-of-frame pulse as described previously. However, unlike the action produced by an end-of-frame pulse, register 320 is not reset. Hence, by adding a binary 1 to the contents of the register while in any mode, the register is advanced from one mode into another. This may be seen, for example, by noting that in mode 1 the output signals from the register appearing upon leads R1, R2, and R3 are 0, 0, and 1, respectively. Upon the addition of a binary 1 to the contents of the register, the output signals change to 0, 1, and 0, respectively, which, as may be seen from FIG. 11, corresponds to mode 2.

After the register's contents have been changed as outlined above, coincidence gates 321, 322 and 323 are again energized after being disabled by the triggering of multivibrator 365, and the contents of the register are applied to mode translator 310, to advance-transfer control 330, and to core memory 370 to establish all of these units in the new mode into which the register has advanced.

(2) *Transfer.*—A transfer pulse from advance-transfer control 330 is applied via OR gate 301 to the reset input of register 320, thus resetting the register. The transfer pulse is also applied via OR gate 364 to trigger monostable multivibrator 365, thus to isolate register 320. The same transfer pulse, after being delayed by a delay unit 362, is applied to the read-out input of core memory 370. Accordingly, the contents of the core memory, appearing upon leads CM1, CM2, and CM3, are applied to register 320 after the register is reset and during the period in which it is isolated.

FIG. 11 tabulates, for the various operational modes, the signals that appear upon the leads CM1 through CM3 when the core memory is pulsed for read-out. For example, if the core memory is in mode 2, the output signals appearing upon leads CM1 through CM3 at read-out are respectively 1, 0, and 1. Since these signals are applied to register 320, they determine the contents of the register for the following mode. Thus, in the example chosen, leads R1, R2, and R3 of register 320 are transferred from states 0, 1, and 0, respectively, corresponding to mode 2, to states 1, 0, and 1, respectively, which corresponds to mode 5, as may be seen from FIG. 11. Thus, it may be noted that, for any mode of operation, the output condition of the core memory corresponds to the output condition that is assumed by the register 320 after a transfer is made from the current mode into another. As in the case of an advance order, the new register output signals, following transfer, are applied to mode translator 310, to advance-transfer control 330, and also to the core memory 370 to establish each of these elements in the new mode.

Tracking

Tracking unit 200 is depicted in FIG. 5. Before the apparatus is described in detail according to its operation in the various tracking modes, the more important portions of the circuitry will be delineated.

Three analog memory devices 214, 215, and 216 (in the center of FIG. 5) comprise the heart of the tracking circuit. Memory 214 serves to store analog signals representative of a line as it is tracked by the unit, while memory 215 serves to store analog signals representative of newly detected material that is to be examined to determine whether or not it forms a valid new line segment. Depending upon the mode of operation, that is, whether the unit is tracking or is examining new information, output signals from either memory 214 or memory 215 are gated through various components to analog memory 216. This memory serves to establish a window section in each line sweep during which the tracking unit is gated to receive information. Thus, depending upon which one of the memories 214 and 215 supplies input signals to memory 216, the window is utilized either to track a line segment or to examine newly detected material.

A coincidence gate 207 (in the lower left-hand corner of FIG. 5) is responsible for indicating whether or not the tracking unit detects an intersection of the flying spot with the scanned material during the window established in any line sweep. A lack of a detected intersection within the window results in the energization of the gate and an output pulse from lead OP4. The appearance of such a pulse results in the transfer of the unit into another mode.

(A) MODE 1

This mode is utilized for the detection in any line sweep of the first intersection of the flying spot with the scanned matter. As pointed out in connection with FIG. 6, output lead MT1 from tracking mode control unit 300 is energized in mode 1. Lead MT1 is connected to an OR gate 202 and to a coincidence gate 203. The output of OR gate 202, which is thus energized in mode 1, is connected to one of three gating inputs to a linear transmission gate 201. Of the two remaining gating inputs, the one that is connected to the output of coincidence gate 203 serves to inhibit gate 201. Input signals to gate 203 are applied via leads MT1 and $FR_n$. Lead $FR_n$ stems from timed pulse generator 191 of FIG. 4, and is energized only during the last $n$ line sweeps of an interrogation frame comprising the Track portion. Thus, during the first $m$ line sweeps of the frame comprising the Search and Track portion, gate 203 is disabled and cannot inhibit transmission gate 201.

The remaining gating input to linear transmission gate 201 is connected to lead C2 which carries amplified pulses from photomultiplier tube 115 of FIG. 4. Applied to the transmission input of gate 201 via the lead LS is the line sweep potential from line sweep generator 150 of FIG. 4. Thus, during any line sweep as the first pulse appears on gating lead C2, indicating the first intersection in that line sweep of the flying spot with the scanned material, the line sweep potential is gated through gate 201. The magnitude of the line sweep potential at that instant is indicative of the distance between the beginning of the line sweep and the point on the sweep at which the intersection is noted. This potential is gated through gate 201 to lead OP1 which is connected to the transmission input of a linear transmission gate 213. Also connected to gate 213 as an inhibiting input is lead MT4 from mode translator 310 of FIG. 6. Since lead MT4 is not energized during mode 1, the gated line sweep potential from gate 201 passes through gate 213 to analog memory 214 wherein it is stored for the remainder of the line sweep.

The output signal from gate 201 is also applied via lead OP1 to advance-transfer control 330 of FIG. 6. Since this output signal is in analog form, it may be clipped to provide a signal which is easily handled by the digital gates comprising control 330. As is shown in FIG. 11, when a signal appears upon lead OP1 during mode 1, an advance order is given by advance-transfer control 330. Thus, as soon as the first intersection is detected in any scanning line while in mode 1, the tracking unit is immediately advanced into mode 2. In this respect it should be noted that the cycling time of the tracking mode control unit 300, for example, the time required for the unit to advance or transfer from one mode to another, may be made very short as compared with the time taken for a line sweep of the flying spot. Thus, as compared with the spot movement, cycling of the control unit may be considered to be instantaneous.

(B) MODE 2

Mode 2 is the general tracking mode. In this mode, none of leads MT1 through MT4 from tracking mode control unit 300 are energized. Thus, after an advancement from mode 1 into mode 2, no further signals may be gated through linear transmission gate 201 during the remainder of the line sweep in which the advancement occurs. At the end of the line sweep, and indeed at the end of all line sweeps, a series of pulses P1, P2, P3, P4, and ST are initiated from timed pulse generator 192 of FIG. 4, whose input is derived from line sweep generator 150. These pulses are depicted in FIG. 10, and, as may be seen, all occur within the flyback interval of the flying spot, that is, during the interval between the end of one line sweep and the beginning of the next. The pulses conveniently may be evenly spaced within this interval, one requirement being, however, that pulse P1 commences subsequent to a time T2 after the commencement of flyback. As will be shown, time T2 is the window time of the tracking unit during which the unit is gated to receive information in a line sweep. Further, the pulse ST should occur at the beginning of each line sweep.

Pulses P1 through P4 and ST are transmitted from the timed pulse generator 192 (FIG. 4) via leads whose designations denote the pulses carried thereon, and are applied to the tracking unit 200. Lead P1 is connected to the reset input of a bistable multivibrator 205 and also to the gating input of a linear transmission gate 235. Connected to the transmission input of gate 235 is the output lead from analog memory 214. Thus, at the end of each line sweep, the potential stored in the analog memory is gated through gate 235 to a low pass filter 241 which smooths the signal applied thereto. The signal output of the filter is applied to curve detector 400 of FIG. 7 and to utilization device 500 shown in block form in FIG. 1.

Pulse P2, which follows in time pulse P1, is applied to the reset input of analog memory 216, thus resetting this memory to zero.

Pulse P3, which follows pulse P2, is utilized for a counting operation and to transfer information to the "window establishing" analog memory 216. Since the establishment of the window is common to nearly all the tracking modes, a description of it follows.

(C) ESTABLISHMENT OF THE WINDOW

Lead P3 is connected to the gating inputs of a pair of linear transmission gates 230 and 232. Connected to the other gating inputs of the transmission gates is lead MT2 from the tracking mode control unit. This lead, when energized, enables gate 230 and inhibits gate 232. From FIG. 11 it may be seen that lead MT2 is energized only during modes 3 and 4. Thus, at the end of each line sweep during these modes, and upon the occurrence of a gating pulse P3, gate 230 transmits the signal applied thereto from analog memory 215. In each of the remaining modes, however, lead MT2 is not energized, and at the end of each line sweep during these modes the information in analog memory 214 is gated through transmission gate 232.

The signal outputs of gates 230 and 232, only one of which provides a signal at the end of each line sweep, are applied to an analog subtractor 231. The signal output of the subtractor is equal to its signal input minus a potential corresponding to the line sweep potential necessary to deflect the flying spot a distance $w/2$ (as shown in FIG. 12), and is applied to analog memory 216 wherein it is stored. The stored potential, applied from the memory 216 to the transmission input of a linear transmission gate 212 and to the control input of a variable pulse monostable multivibrator 220, corresponds to the distance between the edge of the frame and the last-noted intersection minus distance $w/2$. Depending upon the mode of operation, the information concerning the last-noted intersection is supplied from either analog memory 214, relating to the tracking of a line, or memory 215, relating to the inspection of new material.

Following the transfer of information from one of analog memories 214 and 215 to memory 216, a pulse P4 is applied to coincidence gate 226 and directly to the reset input of analog memory 215, thus resetting the memory to zero. Also connected to gate 226, as an inhibiting input, is lead MT4, which is energized only in modes 3, 4, and 5. During these modes, the output of gate 226 cannot be energized upon the occurrence of pulse P4, and thus memory 214, to which the gate is coupled, cannot be reset.

At the commencement of each line sweep, a start pulse is applied via the lead ST to the triggering input of monostable "variable pulse" multivibrator 220, thus to trigger the multivibrator to its unstable "on" state. The multivibrator 220, which typically is of the type described in Millman and Taub, sections 6–8 and 6–9 supra, remains in its unstable "on" state for a period of time proportional to the control potential supplied from analog memory 216. The output signal from the multivibrator 220 is applied to coincidence gate 222 and to differentiator and clipper 223. Connected as an inhibiting input to gate 222 is lead MT4 which is energized only during modes 3, 4, and 5. Thus, during modes 1 and 2 (mode 6 is unimportant here, since it is merely a transient, transfer mode) the output of gate 222 is energized. This results in the energization of the output of an OR gate 221, and the enablement of linear transmission gate 210. In this fashion, in mode 2 gate 210 is enabled from the beginning of the line sweep until the flying spot is within distance $w/2$ from the intersection noted in the previous line sweep, and thus the gate is free to pass information concerning intersections detected ahead of the "window." (Mode 1 is unimportant here, since, for this mode, the tracking unit retains no information pertaining to previous line sweeps.)

At the end of its unstable "on" period, multivibrator 220 returns to its stable "off" state, and differentiator and clipper 223 emits a pulse. The pulse is applied to a monostable multivibrator 224 to trigger the multivibrator to its unstable "on" state. Due to the clipping action of element 223, multivibrator 224 is triggered "on" only when multivibrator 220 returns to its stable "off" state. The time, T2, during which multivibrator 224 is in its unstable "on" state is chosen to be equal to the time that elapses during which the flying spot travels distance $w$. Accordingly, the output of the multivibrator, which is responsible for establishing the window, is connected both to coincidence gate 225 and, after being delayed by delay line 206, to one input of coincidence gate 207. The output of multivibrator 224 is also connected through OR gate 202 to one of the gating inputs to linear transmission gate 201. In this fashion, during normal tracking of a line segment in mode 2 gate 201 (which supplies tracking memory 214 with input signals) is enabled only for the time T2 during which the flying spot travels through the section of a line sweep lying a distance $w/2$ on either side of the intersection noted in the previous line sweep. Should the tracking unit be in modes 3, 4, or 5, however, the output signal from the multivibrator energizes gate 225 since lead MT4 is energized and gate 225 is enabled. The output signal from gate 225, passes through OR gate 221 and enables linear transmission gate 210. It supplies input signals to the "search" memory 215. In this fashion the window is established in these modes for the examination of newly detected material that lies closer to the line sweep beginnings than material previously tracked.

The absence of a detected intersection within the above-mentioned window in any mode is noted in the following fashion. Pulses from photomultiplier tube 115 of FIG. 4 that appear on lead C2 are applied to one input of coincidence gate 204. The other input of the gate is energized by the "window establishing" monostable multivibrator 224. Thus, whenever a pulse occurs within the given window, gate 204 is energized and its output triggers bistable multivibrator 205 to its "set" state. The output of the multivibrator is energized only in the "reset" state, and thus disables coincidence gate 207. In the event that a pulse does not appear on lead C2 during the window in any line sweep, multivibrator 205 is not "set," and thus its output lead is energized, enabling gate 207. As a result, as soon as the output signal from multivibrator 224, after being delayed by delay line 206, provides energization of the other enabling input of coincidence gate 207, an output pulse appears upon lead OP4. The inhibiting lead to gate 207, connected from bistable multivibrator 207, is energized only under certain circumstances during mode 2. They will be explained later.

(B) MODE 2 OPERATION

At the end of each line sweep in mode 2, the potential in analog memory 214 is gated through gate 235 by pulse P1 to low pass filter 241 and thence to curve detector 400 and to utilization device 500. The output signal from memory 214 is also gated into analog subtractor 231 and thence into analog memory 216 after the resetting of the memory by pulse P2. Accordingly, after each line sweep in this mode, the information gated during the window established in the line sweep is utilized to establish the window for the following line sweep. In this fashion the unit tracks a line segment, as, for example, the line designated $a$ in FIG. 12, for the first three line sweeps.

Still referring to FIG. 12, it may be seen that in the fourth line sweep a small dot appears at the point $b$ which is not part of the line segment $a$ being tracked, but which nevertheless is detected by the tracking unit. At the beginning of the fourth line sweep, monostable multivibrator 220 is energized and its signal output passes through gates 222 and 221 to enable linear transmission gate 210. As soon as a pulse is received upon lead C2, indicating an intersection of the flying spot with the matter at point $b$, linear transmission gate 210 passes the line sweep potential at that instant into analog memory 215. Upon the appearance of an output signal from gate 210, coincidence gate 211 is energized at one of its input leads. The other input lead to gate 211, that is, inhibiting lead $FR_n$, is energized only during the Track portion of an interrogation frame. This portion comprises the latter $n$ line sweeps of the frame, and, from FIG. 12, it may be seen that it constitutes the final fifty line sweeps of the illustrated frame. Thus, lead $FR_n$ is not energized in the fourth line sweep, and gate 211 provides an output signal upon the detection of the intersection with point $b$. The signal output of gate 211 is applied to advance-transfer control 330 of FIG. 6 via lead OP2. Since the output signal from gate 210 is an analog signal, it may be clipped to provide an output suitable for handling by digital control 330. From FIG. 11, when lead OP2 is energized in mode 2, an advancement order is initiated by advance-transfer control 330 to advance the unit from mode 2 into mode 3. In this respect it should be noted that an advancement cannot be made from mode 2 into mode 3 during the Track portion of an interrogation frame. Thus, for example, when the line segment $e$ of FIG. 12 is detected closer to the frame edge than the line $d$ which is currently being tracked, the tracking unit remains in mode 2 and continues to track the line $d$, ignoring the segment $e$.

The advance pulse from control 330, responsible for the advancement from mode 2 into mode 3, is applied to OR gate 228 of FIG. 5, thus resulting in the energization of one input of coincidence gate 227. Connected to the other input of gate 227 is lead MT5 which is energized during mode 2. Thus, during mode 2, when the advance order is generated by control 330 and concurrent with the advancement into mode 3, an output pulse appears from gate 227. This pulse is applied to the gating input of a linear transmission gate 212 and also to the "set" input of bistable multivibrator 217. Upon being "set," the output of the multivibrator is energized, thus providing inhibiting inputs to coincidence gates 207 and 225. Multivibrator 217 remains in its "set" state for the remainder of the current line sweep; it is returned to its "reset" position at the commencement of the next line sweep upon the occurrence of a start pulse appearing upon lead ST. Thus, for the remainder of the line sweep coincidence gate 225 is inhibited. This results in the inhibition of linear transmission gate 210 to which gate 225 supplies an enabling signal through OR gate 221. This prevents further signals from being gated into memory 216. For the remainder of the line sweep coincidence gate 207 is also inhibited, preventing an output pulse from appearing upon lead OP4 which would result in an erroneous transfer order from advance-transfer control 330.

The output signal from gate 227 is applied to the gating input of linear transmission gate 212. Applied to the transmission input of this gate is the potential stored in analog memory 216. This potential is indicative of the distance from the edge of the frame to the point at which an intersection of the flying spot with a scanned character was noted in the previous line sweep. This information is gated through gate 212 and is applied to analog memory 214 which was reset at the beginning of the current line sweep. Thus, analog memory 214 contains information relative to the last-noted intersection of the line segment previously tracked in mode 2 prior to the detection of new information which resulted in the advancement into mode 3.

(E) MODE 3

Mode 3 is a testing mode to determine if, on the next line sweep following an advancement into the mode, another intersection pertaining to the newly detected material is noted lying within the window. Following the advancement into mode 3, leads MT2 and MT4 are energized from mode translator 310. Lead MT4 is connected as an inhibiting lead to the gating input of linear transmission gate 213, thereby preventing any signals from being gated into analog memory 214 which contains information relative to the line previously tracked. Lead MT4 is also coupled to coincidence gates 222, 225, and 226, serving as an inhibiting input to gates 222 and 226 and as an enabling input to gate 225. The inhibition of gate 226 prevents analog memory 214 from being "reset" while in mode 3. The inhibition of gate 222 prevents variable pulse monostable multivibrator 220 from energizing linear transmission gate 210. However, gate 210 has its gating input signal in mode 3 applied via gate 221 from coincidence gate 225 which is now enabled by lead MT4. In this respect it should be noted that during the line sweep in which the unit first transfers into mode 3, gate 225 is inhibited by the action of multivibrator 217. Since the multivibrator is triggered to its "reset" position at the commencement of the next line sweep, however, gate 225 is no longer inhibited. Thus, in the following line sweep when monostable multivibrator 224 is energized, resulting in the energization of gate 225 and the consequent enabling of the transmission gate 210, a new window of the tracking unit is established.

Lead MT2 is energized in mode 3. Upon its energization, it inhibits linear transmission gate 232 and enables linear transmission gate 230. Thus, upon the occurrence of pulse P3 at the end of the line sweep in which the unit advanced into mode 3, transmission gate 230 is enabled, passing information from analog memory 215, indicative of the new information under inspection, into analog subtractor 231. Output information from the subtractor is applied to the input of analog memory 216 and serves to establish a new window in mode 3.

During the following line sweep, when monostable multivibrator 224 is triggered "on," it energizes, through gates 225 and 221, linear transmission gate 210. Monostable multivibrator 224 also energizes, through gate 202, transmission gate 201. Thus, gates 201 and 210 are enabled for a time T2 which establishes a window about the intersection detected in the previous line sweep. Only gate 210 need be considered, however, since gate 213 is inhibited by the signal on lead MT4, thus isolating memory 214 from gate 201. If an intersection in the instant line sweep is not detected within the window, as in the fifth line sweep in FIG. 12 for which no intersection is detected within distance w/2 on ether side of point b, no output signal is produced by gate 210. Since no intersection occurs within the window, multivibrator 205 is not "set," but remains in its "reset" state and energizes the output lead coupled to coincidence gate 207. After a slight delay provided by delay line 206, the output signal from multivibrator 224 energizes the other enabling input of coincidence gate 207. Accordingly, an output signal appears on lead OP4, indicating no intersection on the instant line sweep within the window. From FIG. 11 it may be seen that, in mode 3, as an output signal is emitted from gate 207 on lead OP4, a transfer pulse is generated by advance-transfer control 330. The unit immediately transfers into mode 2 in which none of leads MT1 through MT4 are energized. At the end of the current line sweep, the information retained in memory 214 pertaining to the line previously tracked is gated through gate 232. From gate 232, this information passes to subtractor 231, from which it is applied to analog memory 216. Thus, the window is again established at the location pertaining to the line previously tracked, and the line continues to be tracked. For example, referring to FIG. 12, line a is tracked in the sixth and following line sweeps after the dot b is inspected.

If, however, while in mode 3 an intersection occurs within the distance w/2 from the intersection detected in the previous line sweep, as in the ninth line sweep in FIG. 12, an output signal is emitted from linear transmission gate 210. The signal is applied to analog memory 215 and also to coincidence gate 211. Since lead FR$_n$, coupled to gate 211, is not energized during the Search and Track portion of an interrogation frame, gate 211 is not inhibited and thus an output signal appears on lead OP2. The output signal is transmitted to advance-transfer control 330, and, since the unit is in mode 3, an advancement is immediately effected into mode 4.

(F) MODE 4

Mode 4 is the timing mode in which it is determined if new intersections pertaining to the newly detected material occur within the window for each of a number of sequential line sweeps. During this mode, leads MT2, MT3, and MT4 from mode translator 310 of FIG. 6 are energized. Leads MT2 and MT4 carry out the same functions in mode 4 as in mode 3. Lead MT3, however, is connected to one input of coincidence gate 236, the other input of which is connected to lead P3. Since pulse P3 is present on this lead at the end of each line sweep, gate 236 is energized at times to provide an output pulse to the counter 238, which thus counts the number of line sweeps that pass while the unit is in mode 4. It will be noted that the first count is registered at the end of the line sweep in which the unit transfers into mode 4.

From FIG. 11 it may be seen that the unit transfers from mode 4 into mode 2 upon the occurrence of either an output signal on lead OP4 or on lead OP3. An output signal is obtained from lead OP4 should an intersection not occur in any line sweep within the window. If such is the case, a pulse appears on lead OP4 as soon as the loss of the detected intersection is noted, and the unit transfers from mode 4 into mode 2. In mode 2 the information contained within analog memory 214 pertaining to the line previously tracked is transferred into memory 216 via gate 232 and analog subtractor 231, and the tracking unit continues to track the line. Such is the case, for example, in the tenth line sweep of FIG. 12 where, after the tracking unit is placed in mode 4 in the ninth line sweep, an intersection is missed within the distance w/2 from the intersection detected in the ninth sweep. Thus, as soon as the miss is noted, the unit immediately transfers into mode 2 and the line a is again detected on the eleventh line sweep at approximately the thirty-third vertical line.

Should intersections be detected in each line sweep within the distance w/2 on either side of the intersection noted in the previous line sweep, as is the case with the line segment d of FIG. 12 after it is picked up in the twelfth line sweep, an output does not appear on lead OP4 while in mode 4. Thus, at the end of each line sweep in this mode, counter 238 is pulsed from gate 236. Counter 238 may be set to provide an output pulse upon attaining any given count. For example, in conjunction with the description of FIG. 12, the counter may be conveniently considered to provide an output after three counts. However, this is arbitrary and the invention is in no way limited thereby. The output of the counter is connected to a delay line which delays an applied pulse for a small period of time. After being delayed, the pulse from counter 238 is applied through OR gate 237 to reset the counter. It should be noted that the OR gate also has applied thereto an "end of frame" pulse that appears on lead E$_{fr}$ and a transfer pulse from advance-transfer control 330. Thus, whenever the unit transfers from one mode to another, or the end of a frame is reached, the counter is reset to zero.

The output information from the counter that appears on lead OP3 is applied to advance-transfer control 330. From FIG. 11, it may be seen that such a pulse results in the transfer of the unit from mode 4 back into mode 2. However, due to the delay of delay line 239, an OP3 pulse occurs a short time after pulse P3 sets the counter. Since pulse P3 is responsible for enabling the transmission gates 230 and 232, the potential in analog memory 215 is gated through transmission gate 230 and into analog subtractor 231 prior to transfer from mode 4 to mode 2. The output signal from the subtractor is applied to analog memory 216. Thus, before the transfer, information concerning the newly detected line segment is gated into analog memory 216, and a new window is established in mode 2 for the tracking of the segment. Such a transfer occurs, for example, in the fifteenth line sweep of FIG. 12, and the line d is tracked thereafter.

(G) MODES 5 AND 6

Modes 5 and 6 handle breaks in a line currently being tracked in mode 2, as, for example, at the thirtieth line sweep of FIG. 12, and in the forty-fifth line sweep at the termination of line d. As may be seen from FIG. 11, a transfer is made into mode 5 from mode 2 upon the occurrence of an output signal upon lead OP4, indicating that no intersection occurred within the window established for the current line sweep. Following the transfer into mode 5, leads MT3 and MT4 from mode translator 310 are energized. Signals on lead MT3 energize one input of coincidence gate 236, while signals on lead MT4 inhibit transmission gate 213 and coincidence gates 222 and 226. Inhibiting gate 226 prevents analog memory 214 from being reset in mode 5, while inhibiting gate 213 prevents new information from being gated into the memory.

Upon the transfer from mode 2 into mode 5, a pulse is produced by gate 227 in the same fashion as occasioned by an advancement from mode 2 into mode 3, described previously. Such a pulse enables transmission gate 212, thus gating the potential from analog memory 216, relative to the line tracked prior to the break, into analog memory 214. At the end of the current line sweep, and, indeed, at the end of all line sweeps in which the tracking unit remains in mode 5, this potential is gated from memory 214 by pulse P3 through transmission gate 232 and thence to subtractor 231. The output of the subtractor is applied to analog memory 216 which thus contains information relative to the line tracked prior to the break, and the window is established for each line sweep in mode 5.

At the end of each line sweep in mode 5, pulse P3 and the signal that energizes lead MT3 together enable coincidence gate 236. Thus, counter 238 counts the number of line sweeps that pass in mode 5. From FIG. 11 it may be seen that the unit remains in mode 5 until it either advances into mode 6, upon the occurrence of a pulse upon lead OP1, or transfers into mode 1 in response to a pulse from lead OP3. A pulse on lead OP1 indicates that the "lost line" has again been detected due to an intersection inside the window. As a result, an output signal from linear transmission gate 201 is produced. Such is the case with the break in the line $d$ of FIG. 12 occurring at the thirtieth line sweep. A pulse on lead OP3, on the other hand, indicates that counter 238 has emitted an output pulse. This in turn indicates that a number of sequential line sweeps, in this case three, have passed while the unit is in mode 5, which means that the line previously tracked has ended. Such is the case with the line $d$ of FIG. 12 after it ends at the forty-fourth line sweep.

Mode 6, into which the unit advances from mode 5 should a "lost line" be again detected, is strictly a transfer mode, as may be seen from FIG. 11. Thus, as soon as the unit advance into mode 6, it again transfers into mode 2 in which it continues to track the line that was temporarily "lost." The transfer from mode 6 into mode 2 results in the resetting of counter 238 to zero.

A transfer is made from mode 5 to mode 1 upon the appearance of an OP3 pulse, indicating that the line tracked in mode 2 has terminated. If this occurs within the Search and Track portion of an interrogation frame, the unit is free to commence its search for the segment of a scanned character that lies closest to the edge of the frame comprising the beginnings of the line sweeps. However, if a transfer from mode 5 into mode 1 occurs within the latter portion of an interrogation frame, the tracking unit is effectively shut off. This is because leads $FR_n$ and MT1, which are both coupled to coincidence gate 203, are energized. Energization of leads $FR_n$ and MT1 results in the energization of the output of gate 203 and the consequent inhibition of transmission gates 201 and 210. Accordingly, the line sweep potential may not be gated through these latter gates for the remainder of the frame, and the unit remains in an "off" position in mode 1 until the commencement of the next interrogation frame.

Curve detection

The signals from tracking unit 200 provide, in analog form as a function of time, a representation of the outer contour of a scanned character. During each interrogation scan, the signals are applied to curve detector 400, shown in detail in FIG. 7, which analyzes the information applied thereto and indicates the number and types of basic curves comprising the scanned material.

The determination of the basic curves that form a scanned character is accomplished by detecting the first and second derivatives, with respect to time, of the signals from the tracking unit. Accordingly, these signals are applied to differentiator 401 whose output is applied to another differentiator 402. The signal output of differentiator 401, which is the first derivative, with respect to time, of the signals from the tracking unit 200, is also applied to saturating amplifier 404. Similarly, the signal output of differentiator 402, which is the second derivative with respect to time of the signals from the tracking unit, is applied to saturating amplifier 403. Each of the saturating amplifiers comprises essentially a binary element. That is, for an input signal greater than a small positive potential $\delta$, the amplifier is saturated, and its output potential assumes a fixed value, for example, $-A$ volts; for input signals more negative than a small negative potential $-\delta$, the amplifier is nonconducting, and its output assumes a second fixed potential, for example, $+A$ volts. Should the input to the saturating amplifier be of a value that lies between $-\delta$ and $+\delta$ volts, the output of the amplifier responds in a generally linear fashion ranging between $+A$ and $-A$ volts.

Processed signals from saturating amplifiers 403 and 404 are applied to the inputs of two separate shift registers, shown within the dashed enclosure of FIG. 7. Four separate multistage shift registers are contained within the enclosure, the first stages of which are numbered 411, the second stages of which are numbered 412, and so on to the $n$th stages which are designated $4nn'$. Each of the shift registers is under control of a common shift lead that emanates from a coincidence gate 420. At the end of each frame, an end-of-frame pulse upon the lead $E_{FR}$ resets the shift registers and clears them of all stored information.

The output signals from the saturating amplifiers 404 and 403, which are indicative of the algebraic signs of the first and second derivatives of the signals from the tracking unit, are stored in the first two shift registers. From the previous analysis, it may be seen that a potential of $+A$ volts from either of the saturating amplifiers indicates a negative derivative (more negative than $-\delta$ volts), while an output potential of $-A$ volts indicates a positive derivative (more positive than $+\delta$ volts).

If the $\delta$ region, that is, the region in which either one of the derivatives lies between $-\delta$ and $+\delta$ volts, is chosen to be very small, the particular derivative may be considered to be equal to zero whenever it lies in the region. In order to determine when either one of the derivatives is zero, and also to determine when one of the derivatives either enters or leaves the $\delta$ region, indicating a change in the type of curve, the output signals from the saturating amplifiers 403 and 404 are applied to a pair of slicers 405 and 406, respectively. Each of the slicers provides an output signal only when its input signal is in the range $-A$ to $+A$ volts. For example, if the input signal is between $-A$ and 0 volts, the output signal from the slicer is $-B$ volts; if the input signal is between 0 and $+A$ volts, the output signal is $+B$ volts; at all other times the output signal is zero. The output signals are passed, respectively, to a pair of full-wave rectifiers 407 and 408, thus providing an output potential of $+B$ volts, for example, whenever a differentiated signal lies within the $\delta$ range. The output signals from the rectifiers are, in turn, applied to a pair of inverting saturating amplifiers 409 and 410. Each of these amplifiers operates in a fashion similar to that of the saturating amplifiers 403 and 404, except that it provides an inverted output signal. That is, when the input signal thereto is approximately zero, the output signal is at a nonsaturated or a lower potential; when the input signal thereto is equal to a given potential, for example, $+B$ volts, the amplifier is saturated and its output signal is at a second, higher potential. If the output signals from each of the inverting saturated amplifiers are designated as 0 and 1, corresponding to nonsaturation and saturation, respectively, it may be recognized that an output potential of 0 indicates that the respective derivative of the signal from the tracking unit is outside the $\delta$ region; similarly, an output potential of 1 corresponds to the derivative being inside the $\delta$ region.

The output signals from amplifiers 409 and 410 are applied to a pair of delay lines 416 and 415, respectively, and also to an OR gate 417. After being delayed by lines 416 and 415, the signals from the amplifiers 409 and 410 are applied to the inputs of the remaining two shift registers. Thus, the four shift registers contain information concerning the algebraic signs of the first and second derivatives of the signals from the tracking unit and whether or not these derivatives are within the δ region.

The output of OR gate 417 is applied to a differentiator and full-wave rectifier 418 which supplies a pulse signal every time either one of the amplifiers 409 and 410 changes its output signal from 1 to 0 or from 0 to 1. The output signal from the differentiator and rectifier is applied to a "holding-over" monostable multivibrator 419 and to a coincidence gate 420. The output signal from the multivibrator is applied as an inhibiting signal to this gate. Monostable multivibrator 419 is typically one that has the same circuit configuration as shown in Cattermole, "Transistor Circuits," page 313, FIG. 12.31 (Heywood & Co., Ltd., London, 1959). Such a multivibrator is generally characterized by a charge accumulating capacitor which is coupled to its input circuit. Once the multivibrator is triggered to its unstable state, should a triggering pulse or series of pulses occur before the multivibrator is returned to its stable state, each pulse recharges the input capacitor. This results in the effective return of the multivibrator to the beginning point of its unstable operation after each pulse, so that the return to the stable state of operation occurs only after the last in the series of pulses is received. Thus, assuming that the multivibrator is in a stable state, for example, its output is not energized, a first pulse from differentiator and rectifier 418 triggers the multi-vibrator "on." Before the multivibrator inhibits gate 420, however, the first pulse passes through the gate and energizes the shift lead, thus shifting the contents of the registers by one stage. This leaves the first stages 411 of the registers free to receive new information which is about to be applied thereto, since a pulse from differentiator and rectifier 418 indicates that one of the differentiated signals from the tracking unit is either going into or is leaving the δ region, implying a change from one curve to another. Should differentiator and rectifier 418 continue to provide pulse output signals, thus preventing multivibrator 419 from returning to its stable "off" state, gate 420 is inhibited, and the shift registers are prevented from shifting. In this fashion, the shifting of the registers is inhibited whenever the differentiated signals from the tracking unit enter or leave the δ region many times within a short space of time, indicating uncertain transitions between curves. Multivibrator 419 is not returned to its stable "off" state until such transitions have ceased and the differentiated signals are either entirely inside of or entirely outside of the δ region. In this manner, information concerning temporary transitions is excluded from the shift registers; only information pertaining to permanent transitions is stored therein.

Utilization

Output signals from each of the individual stages of the shift registers within the curve detector, representing the algebraic signs of the derivatives of signals from the tracking unit and whether or not the derivatives are in the δ region, are applied to utilization device 500, shown in block form in FIG. 1. Signals from tracking unit 200, representative of the coordinate positions of scanned material, are also applied directly to the utilization device. Device 500 may comprise any well known configuration of both temporary and permanent memory units which handle information applied thereto and compare it with similar reference information stored therein. The stored reference information, for example, may consist of output signals from either the tracking unit or the curve detector obtained from a prior scanning of standard, reference characters. A best-match between the stored reference information and the information relating to the unknown character is utilized to classify the unknown character.

In the above fashion, signals are obtained from the scanning of graphic material that may be utilized to classify such material. However, it may be appreciated that numerous additions, substitutions, and rearrangements may be made of the apparatus depicted, which is but one illustrative embodiment of the present invention. In fact, a method of scanning, tracking, and searching has been described which may be instrumented in a number of different ways, the best known mode of which contemplated by the inventor has been described herein. Accordingly, the invention should not be deemed to be limited except as it is restrictively defined in the following claims.

What is claimed is:

1. Apparatus for interrogating graphic material comprising, means for scanning a field containing graphic material, each complete scan of said field comprising a frame of a pre-established number of successive line sweeps that are each displaced one from another, means for deriving signals representative of the distances between a reference axis and matter appearing in said field, means for discriminating between said derived signals that pertain to matter not forming a part of said graphic material and said derived signals that pertains to matter forming a part of said graphic material, means active during a first portion of said complete scan of said graphic material for registering only said derived signals pertaining to the segment of said graphic material lying closest to said reference axis, means active during a second portion of said complete scan for registering only said derived signals pertaining to the continuation of said segment of said graphic material noted in said first portion, and means for translating said registered signals into signals representative of the basic curve segments forming said graphic material.

2. In a character recognition system for the classification of graphic material contained in a field, said system including a scanner for continually scanning said field in line sweep fashion, each complete scan of said field comprising a frame of a pre-established number of successive line sweeps that are each displaced one from another; the combination therewith for adjusting the distance between adjacent line sweeps so that a frame of line sweeps exactly encompasses said graphic material comprising means activated in a first frame for producing a first potential corresponding to the distance between a first limit of said graphic material and a measuring axis, means activated in said first frame for producing a second potential corresponding to the distance between a second limit of said graphic material and said measuring axis, means responsive to said first potential for initiating the first line sweep of a second frame at said first limit of said graphic material, and means responsive to the difference between said first and said second potentials for controlling the distance between adjacent line sweeps and the extent of said second frame so that the last line sweep of said second frame intersects said second limit of said graphic material.

3. In a character recognition system including a flying spot scanner that comprises first and second deflection means, means for applying a signal of a first sawtooth waveform to said first deflection means to produce successive line sweeps of a spot of light on a field along a first axis, means for applying a signal of a second sawtooth waveform to said second deflection means to produce successive frames of line sweeps of said spot on said field, each of said frames comprising a predetermined number of said line sweeps, and photosensitive means for detecting reflections of said spot of light from said field thus to produce a pulse output signal whenever said spot of light encounters matter in said field; means for adjusting the size of a frame exactly to encompass a character contained in said field comprising means effective in a first frame and activated by the first one of said pulse output signals during the duration of said first pulse signal for registering the instantaneous value of said second sawtooth signal, means effective in said first frame and activated by the last one of said pulse output signals during the duration of said last pulse signal for registering the instantaneous value of said second sawtooth signal, means effective during a second frame to establish the initial value of said second sawtooth signal at a value equal to said first registered sawtooth signal, and means for adjusting the final value of said second sawtooth signal during said second frame to be equal to said last registered sawtooth signal.

4. In combination with apparatus as recited in claim 3, means for selectively changing the directions in which said spot is deflected to produce said line sweeps and said frames of line sweeps, said last-named means comprising switching means effective after said second frame for applying said first sawtooth signal to said second deflection means and said second sawtooth signal to said first deflection means.

5. In apparatus for the interrogation of graphic material in which scanning means are employed to scan an area in a series of line sweeps thus to derive signals in each of said line sweeps representing the positions of matter in said area, means for determining if a selected one of said signals is associated with matter forming a portion of graphic material in said area comprising means for detecting a signal in a line sweep only if it represents matter located within a predetermined distance from matter represented by a signal detected in a previous line sweep, and means for providing an output indication if one of said signals is detected by said detecting means for each of a pre-established number of sequential line sweeps following the line sweep in which a signal was initially detected thus to indicate that said initially detected signal probably forms a portion of said graphic material.

6. In apparatus for the interrogation of graphic material in which scanning means are employed to scan an area in a series of line sweeps thus to derive signals representing the positions of matter in said area, first means for permanently registering the first one of said signals encountered in any line sweep, means for deactivating said first means and for activating second means upon the permanent registering of a signal by said first means, said second means comprising means for permanently registering in any line sweep a signal which represents matter that lies a distance $d_s$ from a reference axis, where $d_s$ is related both to the distance $d_m$ between said reference axis and the matter represented by the signal last permanently registered and to a predetermined distance $w$ by the relation:

$$d_m - \frac{w}{2} \leq d_s \leq d_m + \frac{w}{2}$$

third means for temporarily registering in any line sweep a signal that represents new matter lying closer to said reference axis than the matter represented by signals currently permanently registered by said second means, means for applying said temporarily registered signal to discrimination means to determine if said temporarily registered signal pertains to said graphic material, said discrimination means comprising in combination fourth means for temporarily registering a signal in a line sweep only if it represents matter located within a predetermined distance from the matter represented by a signal temporarily registered in the previous line sweep, means responsive to signals temporarily registered by said fourth means for each of a pre-established number of sequential line sweeps following the line sweep in which said signal was temporarily registered by said third means for providing an output signal, and means activated by said output signal for applying the signal last temporarily registered by said fourth means to said second means thus for enabling said second means permanently to register signals representing said new matter in following line sweeps.

7. In combination with apparatus as recited in claim 6, fifth means activated upon the absence in any line sweep of both the permanent registering of a signal by said second means and the temporary registering of a signal by said third means, said fifth means comprising means for activating said first means and deactivating said second means if no signal is permanently registered by said second means during a predetermined number of sequential line sweeps.

8. In combination with apparatus as recited in claim 7, means activated after a given number of sequential line sweeps following an initial reference line sweep for inhibiting the activation of both said first means and said third means.

9. Apparatus for tracking selected portions of graphic material contained in a field which is scanned in a series of successive line sweeps comprising means for deriving signals representative of the distances between a reference axis and matter in said field, means for establishing predetermined modes of operation comprising in combination detection mode means first activated for permanently registering in any line sweep the first one of said derived signals, means for activating tracking mode means and deactivating said detection mode means after the registering of a signal by said detection mode means, said tracking mode means comprising means for establishing a window to register permanently in any line sweep one of said derived signals only if it represents a distance $d_s$ that is not less than $$d_m - \frac{w}{2}$$

or greater than $$d_m + \frac{w}{2}$$

where $d_m$ is a distance established by the signal last permanently registered and $w$ is a predetermined distance, interrogation mode means for the temporary registering in any line sweep of a signal representing a distance less than said distance $d_s$, decision mode means for establishing a new window by said second-mode means corresponding to signals temporarily registered by said interrogation mode means if for each line sweep of a given number of sequential line sweeps said temporarily registered signal represents a distance that is not less than $$d_n - \frac{w}{2}$$

or greater than $$d_n + \frac{w}{2}$$

where $d_n$ is the distance represented by the signal temporarily registered in the previous line sweep, timing mode means for counting line sweeps following a line sweep in which a signal is neither permanently registered by said tracking mode means nor temporarily registered by said interrogation mode means, and transfer means operating in association with said timing mode means for reactivating said detection mode means and deactivating said tracking mode means if a specified number of sequential line sweeps should pass in which no signal is permanently registered by said tracking mode means.

10. In combination with apparatus as recited in claim 9, means activated after a predetermined number of sequential line sweeps following an initial reference line sweep for inhibiting both said detection mode means and said interrogation mode means.

11. In conjunction with character recognition apparatus that provides output signals indicative of the coordinate positions of graphic material in a field, means for translating said output signals to signals representative of basic curve segments forming said graphic material, said translating means comprising in combination means for producing the first derivative of said output signals, means for producing the second derivative of said output signals, means for detecting when either one of said derivatives lies within a region whose limits are defined by the values zero plus a specified increment and zero minus said specified increment, means for recording said first and said second derivatives, and inhibiting means for preventing the recordation of said first and said second derivatives if either one of said derivatives enters or leaves said region within a specified period from that in which a preceding entry into or departure from the region was made.

12. Apparatus for the determination of basic line segments that together form graphic material contained upon a surface comprising means for scanning said surface in a series of $m+n$ line sweeps in which each of said line sweeps proceeds in a first direction and in which each of said line sweeps is displaced one from another a given distance in a second direction, means for deriving signals representative of the distances between a reference axis and matter appearing on said surface, a plurality of mode means only one of which is activated at any time for establishing particular modes of operation thus to note only selected ones of said derived signals comprising first mode means for permanently noting the first of said derived signals that appears in any line sweep, second mode means activated after the noting of a signal by said first mode means comprising means for permanently noting in any line sweep that signal which represents a distance $d_s$ from said reference axis, $d_s$ being defined as:

$$d_m - \frac{w}{2} \leq d_s \leq d_m + \frac{w}{2}$$

where $d_m$ is the distance represented by the signal last permanently noted and $w$ is a predetermined window distance, said second mode means further including means for temporarily noting in any line sweep a signal that represents a distance $d_t$ that is less than $d_s$, third mode means activated during the line sweep immediately following that in which a signal is temporarily noted by said second mode means, said third mode means comprising means for temporarily noting during said following line sweep only a signal that represents a distance not less than $$d_t - \frac{w}{2}$$

or greater than $$d_t + \frac{w}{2}$$

first transfer means for reactivating said second mode means if no signal is temporarily noted by said third mode means, advance means for activating fourth mode means if a signal is temporarily noted by said third mode means, said fourth mode means comprising means for temporarily noting in any line sweep only that derived signal that represents a distance that is not less than $$d_n - \frac{w}{2}$$

or greater than $$d_n + \frac{w}{2}$$

where $d_n$ is the distance represented by the signal last temporarily noted, second transfer means for reactivating said second mode means if a signal is temporarily noted by said fourth mode means during each of a given number of sequential line sweeps, said second transfer means further comprising means for transferring the last of said signals temporarily noted by said fourth mode means to said second mode means as a permanently noted signal, third transfer means for reactivating said second mode means after said given number of sequential line sweeps if said second transfer means is inoperative, fifth mode means activated if during any line sweep while said second mode means is activated signals are neither permanently nor temporarily noted by said second mode means, said fifth mode means comprising means for permanently noting in any line sweep only that derived signal representing said distance $d_s$, fourth transfer means for reactivating said second mode means if a signal is permanetly noted by said fifth mode means, fifth transfer means for reactivating said first mode means after a specified number of sequential line sweeps if said fourth transfer means is inoperative, and means for inhibiting the operation of both said first mode means and said third mode means during the latter $n$ line sweeps of said series of line sweeps.

13. Translating apparatus comprising means for producing a moving spot of light, means for deflecting said spot in line sweep fashion of $m+n$ lines across a surface containing graphic material, means for altering the direction of sweep of said spot after each sweep of $m+n$ lines in order to scan said character from $d$ different directions, means for detecting during each of the first $m$ line sweeps in each scan in a given direction those intersections of said spot with matter upon said surface that lies closest to the beginnings of said line sweeps, means for registering only those of said detected intersections which comprise intersections with said graphic material, means for detecting and registering during the remaining $n$ line sweeps only those intersections of said spot with the line segment of said character of which the intersections last registered in the first $m$ line sweeps are a part, means responsive to said registered intersections of said $m+n$ line sweeps for developing analog signals representative of the shape of the detected portion of said graphic material, means for determining the first and second derivatives of said analog signals, means for buffering said first and second derivatives to remove information pertaining to erratic curve formations, and means for comparing said analog signals and said first and said second buffered derivatives with like information derived from reference graphic material in order to classify said scanned graphic material.

14. In character recognition apparatus comprising a flying spot scanner having two sets of deflection plates to which are applied sawtooth potentials for producing successive frames each of $m+n$ line sweeps of a spot of light across a field containing graphic material and photosensitive means for detecting the reflections of light from said field, means for interrogating said graphic material comprising means for gating said sawtooth potential that produces line sweeps of said spot each time said photosensitive means produces a pulse output signal thus to produce a gated signal each time said spot encounters matter contained in said field, means for detecting those of said gated signals that constitute intersections of said spot with said graphic material thus to eliminate the detection of intersections of said spot with matter not forming a portion of said graphic material comprising means for registering in a given line sweep one of said gated signals, means for registering in each line sweep of $a$ sequential line sweeps following said given line sweep a gated signal only if said gated signal is of a potential equal to $P_t$, where:

$$P_n - \frac{P_w}{2} \leq P_t \leq P_n + \frac{P_w}{2}$$

in which $P_n$ is the potential of the gated signal registered in the previous line sweep and $P_w$ is a fixed potential, means for providing an output signal if a gated signal is registered during each of said $a$ sequential line sweeps thus to indicate that said gated signal registered in said given line sweep forms a portion of said graphic material.

15. In a character recognition system comprising a flying spot scanner having frame sweep and line sweep deflection means, frame sweep and line sweep sawtooth potentials applied to said frame sweep and line sweep deflection means, respectively, for producing successive frames each of $m+n$ line sweeps of a spot of light across a field containing graphic material, and photosensitive means for detecting the reflections of light from said field thus to produce a pulse output signal each time that said spot encounters matter in said field; the combination therewith comprising gating means activated by said pulse output signals for passing the instantaneous line sweep sawtooth potential to selective registering means, said selective registering means comprising first means for permanently registering in any line sweep the first one of said gated signals, means for deactivating said first means and for activating second means upon the permanent registering of a signal by said first means, said second means comprising means for permanently registering in any line sweep that gated signal of a potential $P_s$ not less than $$P_m - \frac{P_w}{2}$$

or greater than $$P_m + \frac{P_w}{2}$$

where $P_m$ is the potential of the gated signal last permanently registered and $P_w$ is a fixed potential, third means for temporarily registering in any line sweep a gated signal that is of a potential less than $P_s$, fourth means for temporarily registering a gated signal in a line sweep only if it is of a potential not less than $$P_n - \frac{P_w}{2}$$

or greater than $$P_n + \frac{P_w}{2}$$

where $P_n$ is the potential of the gated signal temporarily registered in the previous line sweep, means for providing an output signal if a gated signal is temporarily registered by said fourth means for each of a pre-established number of sequential line sweeps following the line sweep in which said signal was temporarily registered by said third means, and means activated by said output signal for applying the last gated signal temporarily registered by said fourth means to said second means as a permanently registered signal thus to enable said second means to permanently register in following line sweeps signals corresponding to the new portion of said graphic material detected by said third means.

16. In combination with apparatus as recited in claim 15, fifth means activated upon the absence in any line sweep of both the permanent registering of a gated signal by said second means and the temporary registering of a gated signal by said third means, said fifth means comprising means for activating said first means and deactivating said second means if no signal is permanently registered by said second means during a predetermined number of sequential line sweeps.

17. In combination with apparatus as recited in claim 16, means activated after a given number of sequential line sweeps following an initial reference line sweep for inhibiting the activation of both said first means and said third means.

18. Character recognition apparatus using curve tracing in one general direction comprising a line scanner, a memory fed by the output of the scanner when a first scan line crosses a character line, gating means establishing a time area related to the next scan line and sensitive to an output resulting from the second scan line crossing the line of the character, means to feed said memory with the last mentioned output, and decision means to identify the character by the information fed to said memory.

19. Character recognition apparatus comprising a line scanner producing an output pulse when a first scan line crosses a line of the character, gating means responsive to said output pulse which become set at time limits related to the next scan, ahead and behind the time of one scan line to form a time sub area related to the second scan line sensitive to an output caused by a crossing of the character line by said second scan line, memory means fed by the output from the crossing of the character lines in said area, and decision means fed by said memory means to identify the character on the basis of information from said memory means.

20. In character recognition apparatus having a scanner for an area, means responding to outputs from the scanner for identifying the character by character investigation in one general direction, said means comprising a gate system which becomes set during a next scan line crossing of a character line in response to a first output resulting from the previous scan line crossing, the gate system being set for a duration slightly earlier and slightly later than the time of one scan line crossing to define limits of the gate means responding to an output from the scanner which falls within said limits to again set the gating system with new limits, means to recognize the behavoir of the gate system and develop a representative output, and decision means fed by said representative output.

21. The apparatus of claim 20 wherein there is a second gate system similar to the first mentioned gate system, said second gate system becoming set in response to a scanner output which does not fall within any said limits and while said first gate system is operating.

22. In a character reader, a line producing scanner for an area having a character, there being relative movement between the scan lines and the area, means to recognize a first crossing of a charatcer line by a scan line, a gate system set by the first crossing, recognition means to become sensitive to a crossing of the character line by the second scan line within a predetermined sub area of the second scan line time and produce an output if the second scan line crosses the character line in said sub area, means responsive to said output to again set said gate system to produce a similar sub area in the third scan line time and continue to set said gate system so long as scan lines cross the character line within said sub areas, means responsive to said outputs to recognize the behavoir of the trace of the character line formed by the propagation of scan line crossings within said sub areas, and storage means fed by said behavoir recognition means.

23. A reading machine comprising a scanner to scan a character, means responsive to a scanner output for establishing limits in the direction of the scan forming a sub area sensitive to a subsequent scanner output falling therein, and for continuing to form additional sub areas in response to the occurrence of outputs falling within the previous sub area, means to recognize the behavior of said outputs falling within said sub areas and produce a characteristic output signal, and decision means fed by said signal to identify the character.

References Cited

UNITED STATES PATENTS 3,008,123   11/1961   Rohland et al. _____ 340—146.3

OTHER REFERENCES

Optical Character Recognition, pp. 35–37, Spartan Books, 1962.

MAYNARD R. WILBUR, Primary Examiner